(12) United States Patent
Nagasaki

(10) Patent No.: US 9,705,563 B2
(45) Date of Patent: Jul. 11, 2017

(54) INFORMATION PROCESSING DEVICE, COMMUNICATION METHOD, AND COMMUNICATION SYSTEM

(71) Applicant: Seiko Epson Corporation, Shinjuku-ku (JP)

(72) Inventor: Shintaro Nagasaki, Hara-mura (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 14/581,343

(22) Filed: Dec. 23, 2014

(65) Prior Publication Data

US 2015/0180549 A1    Jun. 25, 2015

(30) Foreign Application Priority Data

Dec. 25, 2013 (JP) ................................. 2013-266632

(51) Int. Cl.
*H04B 5/00* (2006.01)
*H04L 12/801* (2013.01)

(52) U.S. Cl.
CPC ........... *H04B 5/0031* (2013.01); *H04L 47/34* (2013.01)

(58) Field of Classification Search
None
See application file for complete search history.

(56) References Cited

PUBLICATIONS

Specification of the Bluetooth System Version 4.1 [vol. 6], pp. 67-69, 574, 575, 578, 579.*
Specification of the Bluetooth System Version 4.2 [vol. 0], pp. 58-60, 232, 560, 561, 564, 565, 578-580.*
Specification of the Bluetooth System Version 4.1 [vol. 3], pp. 233, 574, 575, 578, and 579.*
Bluetooth. Printed Dec. 15, 2014. https://www.bluetooth.org/ja-jp/specification/adopted-specifications. 4 pages.

* cited by examiner

*Primary Examiner* — Daniell L Negron
(74) *Attorney, Agent, or Firm* — Kilpatrick Townsend & Stockton LLP

(57) ABSTRACT

An information processing device includes: an information acquisition unit which acquires information; and a communication unit which communicates with an external device via near field communication. The communication unit divides data of the information into a plurality of blocks, each including a plurality of packets, transmits the plurality of blocks with a first characteristic provided with a property of read with no acknowledge, and receives a receiving result of the blocks in the external device, with a second characteristic provided with the property of write with acknowledge.

6 Claims, 16 Drawing Sheets

INFORMATION PROCESSING DEVICE, COMMUNICATION METHOD, AND COMMUNICATION SYSTEM

This application claims priority to Japanese Patent Application No. 2013-266632, filed Dec. 25, 2013, the entirety of which is hereby incorporated by reference.

BACKGROUND

1. Technical Field

The present invention relates to an information processing device, a communication method and a communication system or the like.

2. Related Art

As the Bluetooth (trademark registered) Low Energy (abbreviated as BLE) has been formulated recently, a smart device (client or peripheral) and a health care device (server or host) can be connected together easily with reduced power consumption. According the BLE, unlike the traditional Bluetooth profile, a profile specialized for a specific case of use (exercise, health, smartphone link or the like) is formulated, and interconnection between different devices is guaranteed as well once the formulated standard profile is supported.

Various reference materials defining the specifications of the BLE are disclosed, for example, on the web page with the URL of https://www.bluetooth.org/ja-jp/specification/adopted-specifications.

The standard profile of the BLE prescribes a method for transmitting and receiving first biological information such as pulse, body temperature, number of steps taken, and calorie expenditure. The first biological information can be transmitted continuously from the health care device to the smart device in such a way as to realize a real time property, while maintaining the reduced power consumption.

However, though the real-time communication method is prescribed, a method for transmitting and receiving data in a lump that is accumulated for a predetermined period, and a method for transmitting and receiving second biological information calculated on the basis of the data accumulated for the predetermined period, for example, calorie intake, mental stress information, sleep information, and behavior analysis information or the like, are not standardized. If the data of the second biological information that constantly changes is to be transmitted continuously, like the first biological information, there is a problem that the power saving property cannot be maintained.

Moreover, if the communication between the health care device and the smart device is disconnected, there is a problem that the first biological information detected during the disconnection of the communication cannot be transmitted or received. Then, if the data of the first biological information detected during the disconnection is to be transmitted and received in a lump after reconnection, the power saving property cannot be maintained, as in the case of the second biological information.

SUMMARY

An aspect of the invention relates to an information processing device including: an information acquisition unit which acquires information; and a communication unit which communicates with an external device via near field communication. The communication unit divides data of the information into a plurality of blocks, each including a plurality of packets, transmits the plurality of blocks with a first characteristic provided with a property of read with no acknowledge, and receives a receiving result of the blocks in the external device, with a second characteristic provided with the property of write with acknowledge.

According to the aspect of the invention, the information processing device divides information into blocks, including a plurality of packets, transmits the information to the external device on a block basis, and receives the receiving result from the external device on a block basis.

Therefore, it is possible to transmit and receive, via near field communication, data of a second data volume that is greater than a first data volume that can be transmitted and received according to the standard profile of near field communication.

In the aspect of the invention, if the communication unit receives an acknowledge command to transmission of the blocks with the second characteristic as the receiving result, the communication unit may determine that reception of the blocks by the external device is successful.

With this configuration, it is possible to determine whether transmission of a plurality of packets is successful or not, simply by receiving the receiving result once.

In the aspect of the invention, if the communication unit receives a sequence number indicating a package of the plurality of packets included in the blocks that are transmitted, with the second characteristic as the receiving result, the communication unit may retransmit packets, starting with the packet corresponding to the sequence number of the plurality of packets.

With this configuration, it is possible to transmit only the packets after the receiving failure occurs, or the like, instead of retransmitting all of the plurality of packets included in each block.

In the aspect of the invention, when the communication unit is in a state where transmission of the information is possible, the communication unit may transmit, to the external device, an upload data size of the information with a third characteristic provided with the property of read with acknowledge.

With this configuration, it is possible to receive the information that the external device accepts the start of transmission, or the like, as well as to report the start of the transmission of data and the upload data size.

Another aspect of the invention relates to an information processing device including: an information acquisition unit which acquires information; and a communication unit which communicates with an external device via near field communication. The communication unit divides data of the information into a plurality of blocks, each including a plurality of packets, receives the plurality of blocks with a first characteristic provided with a property of write with no acknowledge, and transmits a receiving result of the blocks with a second characteristic provided with the property of read with acknowledge.

According to this aspect of the invention, the information processing device receives information divided into blocks, including a plurality of packets, from the external device on a block basis, and transmits the receiving result to the external device on a block basis.

Therefore, it is possible to transmit and receive, via near field communication, data of a second data volume that is greater than a first data volume that can be transmitted and received according to the standard profile of near field communication.

In the aspect of the invention, the communication unit may transmit a sequence number corresponding to a packet that fails to be received, of the plurality of packets included in the blocks that are transmitted, with the second characteristic as the receiving result.

With this configuration, it is possible to report the sequence number of the first packet that fails to be received, to the external device, or the like.

In the aspect of the invention, if the communication unit transmits a sequence number indicating a packet of the plurality of packets included in the blocks that are received, with the second characteristic as the receiving result, the communication unit may receive the plurality of packets again, starting with the packet corresponding to the sequence number.

With this configuration, it is possible to receive again only the packets after the packet receiving failure occurs, or the like, instead of receiving again all of the plurality of packets included in each block.

In the aspect of the invention, the communication unit may receive a communication speed change instruction with a fourth characteristic provided with the property of write with acknowledge, change a communication speed on the basis of the communication speed change instruction that is received, and transmit a communication speed change completion notification with a fifth characteristic provided with the property of read with acknowledge.

With this configuration, it is possible to carry out communication at the communication speed indicated by the received communication speed change instruction, or the like.

In the aspect of the invention, the information may include at least one type of biological information, of pulse rate, number of steps taken, calorie expenditure, calorie intake, mental stress information, and sleep information.

With this configuration, it is possible to transmit biological information of a subject, or the like.

Still another aspect of the invention relates to a communication method including: acquiring information; dividing data of the information into a plurality of blocks, each including a plurality of packets; transmitting the plurality of blocks to an external device via near field communication, with a first characteristic provided with a property of read with no acknowledge; and receiving a receiving result of the blocks in the external device, with a second characteristic provided with the property of write with acknowledge.

Yet another aspect of the invention relates to a communication method including: acquiring information; dividing data of the information into a plurality of blocks, each including a plurality of packets; receiving the plurality of blocks from an external device via near field communication, with a first characteristic provided with a property of write with no acknowledge; and transmitting, to the external device, a receiving result of the blocks with a second characteristic provided with the property of read with acknowledge.

Still yet another aspect of the invention relates to a communication system including: a first information processing device which acquires information; and a second information processing device which communicates with the first information processing device via near field communication. The first information processing device divides data of the information into a plurality of blocks, each including a plurality of packets, and transmits the plurality of blocks to the second information processing device, with a first characteristic provided with a property of read with no acknowledge. The second information processing device receives the plurality of blocks with the first characteristic and transmits, to the first information processing device, a receiving result of the blocks with a second characteristic provided with the property of write with acknowledge. The first information processing device receives the receiving result with the second characteristic.

Further another aspect of the invention relates to a communication system including: a first information processing device which acquires information; and a second information processing device which communicates with the first information processing device via near field communication. The first information processing device divides data of the information into a plurality of blocks, each including a plurality of packets, and transmits the plurality of blocks to the second information processing device, with a first characteristic provided with a property of write with no acknowledge. The second information processing device receives the plurality of blocks with the first characteristic and transmits, to the first information processing device, a receiving result of the blocks with a second characteristic provided with the property of read with acknowledge. The first information processing device receives the receiving result with the second characteristic.

According to some aspects of the invention, an information processing device, a communication method and a communication system or the like capable of transmitting and receiving data of a second data volume that is greater than a first data volume that can be transmitted and received according to the standard profile of near field communication, can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
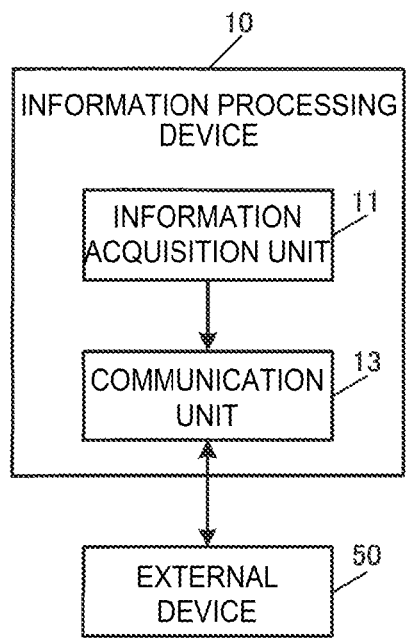
FIGS. 1A and 1B show an example of a system configuration according to an embodiment.

Hereinafter, an embodiment will be described. The embodiment described below should not unduly limit the content of the invention described in the appended claims. Not all the configurations described in the embodiment are essential components of the invention.

1. Outline of this Embodiment

In an information processing device, a communication method and a communication system or the like according to this embodiment, data of a second data volume that is greater than a first data volume that can be transmitted and received according to the standard profile of near field communication can be transmitted and received via near field communication.

In the embodiment, for example, processing in the case where biological information is transmitted and received from a health care device (server or host) to a smart device (client or peripheral), using BLE communication as near field communication, will be described. The BLE is a communication system that achieves a much better power saving property than the traditional near field communication. The health care device is one of the above information processing devices.

Here, biological information transmitted from the health care device include first biological information (or first biological data) and second biological information (or second biological data). Specifically, the first biological information is information of pulse, body temperature, blood pressure, blood sugar level, number of steps taken and calorie expenditure or the like. The first biological information has a first data volume. Meanwhile, the second biological information is, for example, calorie intake, mental stress information (mental state), behavior analysis information and sleep information or the like. The second biological information has a second data volume that is greater than the first data volume. Both of the first biological information and the second biological information are information that changes constantly. The first biological information is information that needs to be reported to the user via real-time communication (information for which the required response waiting time is short) so that the user can grasp the status of his/her own body. Meanwhile, the second biological information is information such that, every predetermined period, for example, every hour, information obtained during that period can be provided (information for which the required response waiting time is long), rather than grasping information in real time.

Since the standard profile of the BLE prescribes a method for transmitting and receiving the first biological information, it is possible to transmit the first biological information continuously from the health care device to the smart device in such a way as to achieve a real time property, while maintaining the power saving property.

However, the standard profile of the BLE does not prescribe a method for transmitting and receiving the second biological information. This is because, in the first place, the BLE is not formulated on the assumption of transmission and reception of data of a relatively large data volume. Therefore, if data of the second biological information is to be transmitted continuously, like the first biological information, there is a problem that the power saving property cannot be maintained since the second data volume is greater than the first data volume. Also, the similar problem occurs in the case where the first biological information is accumulated for a predetermined period and then transmitted in a lump by the BLE.

Thus, in this embodiment, using BLE communication, only the data of the first biological information or the like and summary data, for which the required response waiting time is short, are transmitted continuously in a short cycle, whereas detail data of the second biological information or the like is separately transmitted in a lump.

Specifically, in the embodiment, a unique profile is prescribed in order to transmit data of the second data volume, and the second biological information is transmitted and received on the basis of this unique profile. In the communication based on the unique profile of the embodiment, as described above, the second biological information is associated and recorded with time information in a storage unit in the health care device, and the data of the second biological information is transmitted as a lump every hour, instead of continuously transmitting the second biological information in the same short cycle as the first biological information.

Thus, it is possible to transmit not only the first biological information but also the second biological information from the health care device to the smart device, while maintaining the power saving property.

Moreover, as described above, if the communication between the health care device and the smart device is disconnected, there is a problem that the smart device cannot receive the first biological information detected during the disconnection of the communication.

To address this problem, in this embodiment, the first biological information detected during the disconnection of the communication is stored in the storage unit in the health care device, and after reconnection, the first biological information that is not transmitted yet is transmitted in a lump on the basis of the unique profile. Thus, it is possible to prevent failure to acquire a part of the first biological information in the smart device.

Also, in the embodiment, processing to raise the BLE communication speed during the communication based on the unique profile and to restore the communication speed formulated by the standard profile after the transmission and reception is complete, is carried out. It is also possible to transmit the first biological information on the basis of the standard profile without any change, even when the communication speed is changed. Moreover, it is possible to transmit the first biological information on the basis of the standard profile, in parallel with the transmission of the second biological information based on the unique profile.

Hereinafter, details of the communication method based on the unique profile according to the embodiment will be described first. Afterwards, an example of transmitting the first biological information on the basis of the standard profile and transmitting the second biological information on the basis of the unique profile will be described.

2. Communication Method Based on Unique Profile

2.1. Example of System Configuration

First, FIG. 1A shows an example of the configuration of an information processing device 10 of this embodiment. The information processing device 10 of the embodiment includes an information acquisition unit 11 which acquires information, and a communication unit 13 which communicates with an external device 50 via near field communication. The information processing device 10 of the embodiment is realized, for example, as a health care device. The functions of the information acquisition unit 11 and the communication unit 13 can be realized by hardware such as various processors (CPU or the like) and ASIC (gate array or the like), or by a program or the like. The configuration of the information processing device 10 is not limited to the configuration shown in FIG. 1A and can be modified in various forms, such as omitting a part of the components or adding another component. However, a part or all of the functions of the information processing device 10 may be realized by a server connected to the external device 50 via communication.

2.2. Properties

According to the BLE, a property is provided for each characteristic. A property refers to what defines the type of a series of communication sequences when transmitting and receiving data, using the characteristic thereof. A property may be roughly classified as write or read.

First, a read is a property provided to a characteristic when a server (or host, and in this example, a health care device) transmits data to a client (or peripheral, and in this example, a smart device). A read may be a read with acknowledge (ACK) or a read with no acknowledge. To paraphrase these with the terms used in the specifications on the foregoing web page of https://www.bluetooth.org/ja-jp/specification/adopted-specifications, a read with acknowledge refers to "Indicate" and a read with no acknowledge refers to "Notification".

If the server transmits data with a characteristic provided with a read with acknowledge, to the client, and the client receives the data normally, the client returns an acknowledge command with the same characteristic to the server.

Meanwhile, if the server transmits data with a characteristic provided with a read with no acknowledge, to the client, the client need not return an acknowledge command to the server regardless of whether the data reception is successful or not.

A write, as opposed to a read, is a property provided for a characteristic when the client transmits data to the server.

Similar to a read, a write may be a write with acknowledge or a write with no acknowledge. To paraphrase these with the terms used in the specifications on the foregoing web page of https://www.bluetooth.org/ja-jp/specification/adopted-specifications, a write with acknowledge refers to "Write With Response" and a write with no acknowledge refers to "Write With No Response" or "Write With No Acknowledge".

If the client transmits data with a characteristic provided with a write with acknowledge, to the server, and the server receives the data normally, the server returns an acknowledge command with the same characteristic to the client.

Meanwhile, if the client transmits data with a characteristic provided with a write with no acknowledge, to the server, the server need not return an acknowledge command to the client regardless of whether the data reception is successful or not.

2.3. Upload Sequence

Figure 1B:
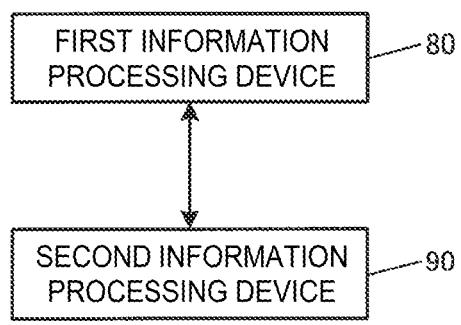

Next, an upload sequence using a unique profile will be described. First, a communication system in this example is illustrated in FIG. 1B. The communication system in this example includes a first information processing device 80 which acquires information, and a second information processing device 90 which communicates with the first information processing device 80 via near field communication. The first information processing device 80 is equivalent to the information processing device 10 (server, for example, health care device, biological information measuring device, or measurement device). The second information processing device 90 is equivalent to the external device 50 (client, for example, smartphone or another smart device).

In this embodiment, in such a communication system, the communication unit 13 of the first information processing device 80 divided data of information acquired by the information acquisition unit 11 into a plurality of blocks, including a plurality of packets (block division).

Figure 2:
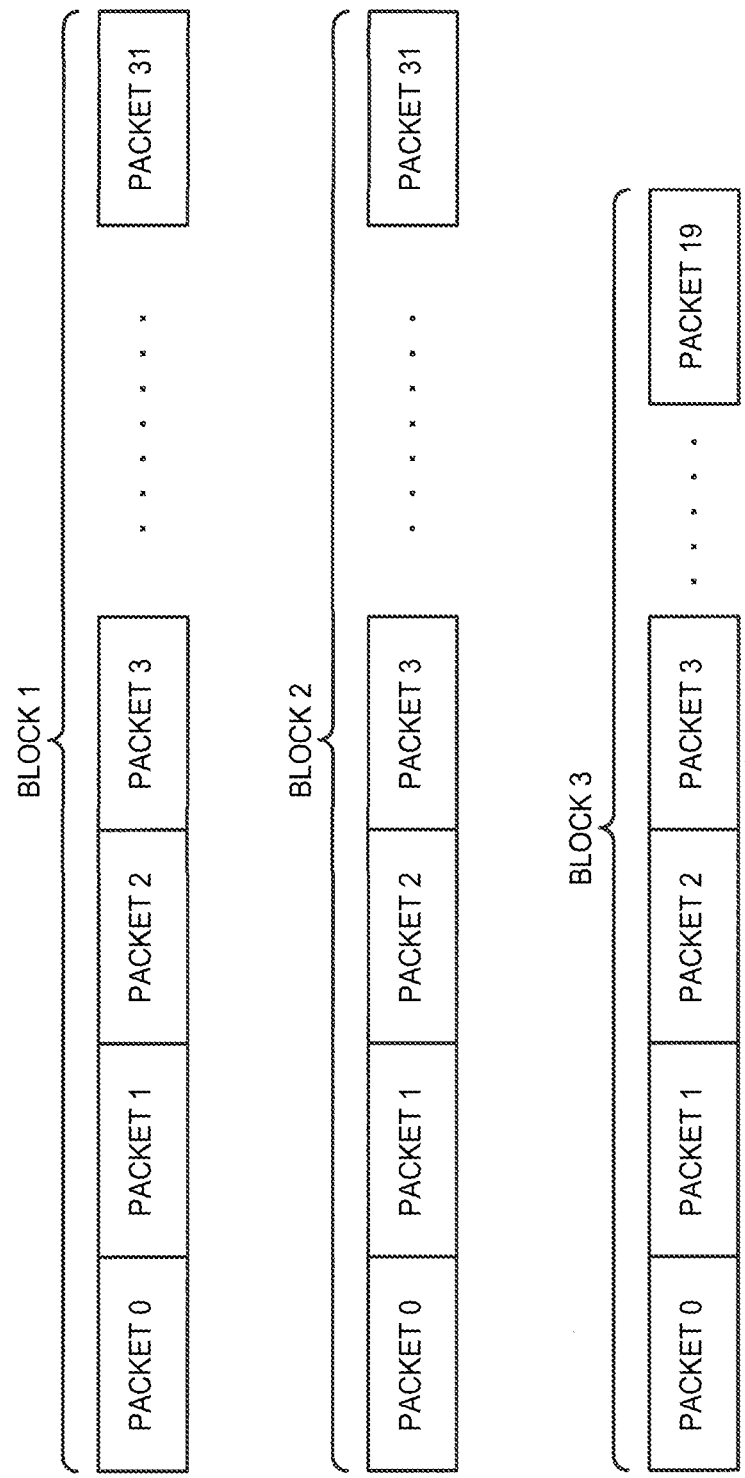
FIG. 2 is an explanatory view of blocks.

A unique profile according to the embodiment prescribes a unit called block including a plurality of packets, as a unit of data. For example, a specific example of blocks, each including a group of up to 32 packets, is shown in FIG. 2. The blocks 1 and 2 shown in FIG. 2 include packets 0 to 31. A block 3 includes packets 0 to 19. In this way, while the maximum number of packets that can be included in each block shown in FIG. 2 is 32, the number of packets included in each block need not be the maximum number of packets. In the example below and the sequence charts of FIGS. 4 to 7, the case of transferring the blocks 1 to 3 shown in FIG. 2 will be described as an example.

Figure 3:
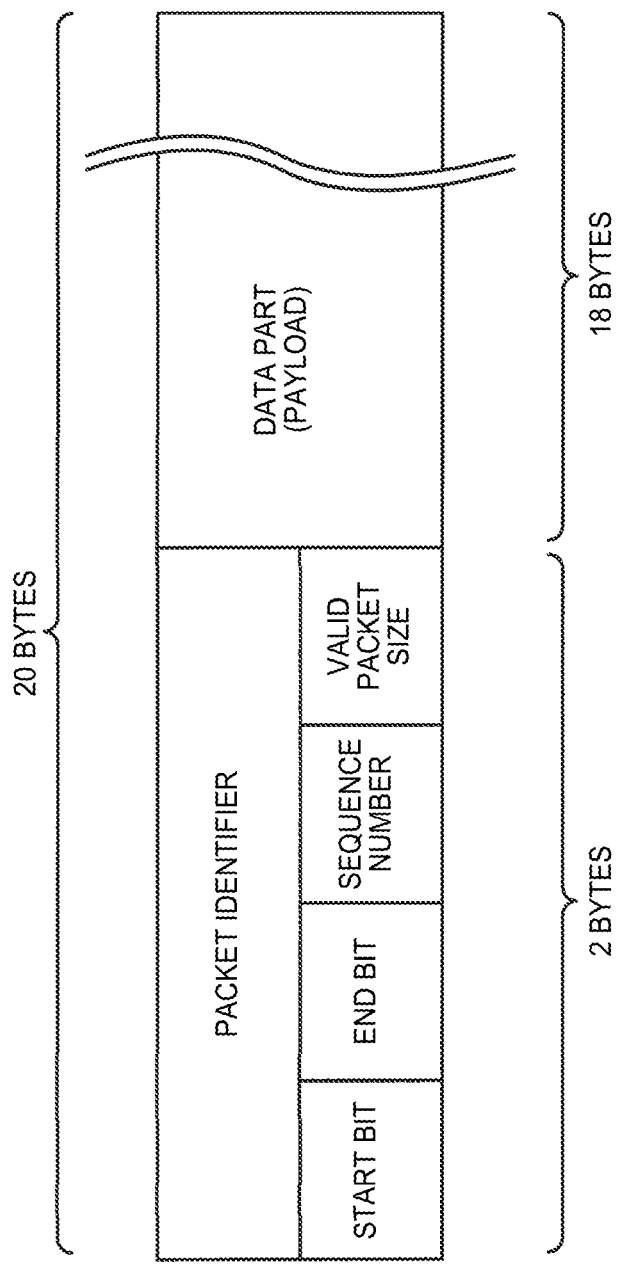
FIG. 3 is an explanatory view of packets.

As a packet, the configuration shown in FIG. 3 is used. Specifically, a packet includes a packet identifier of 2 bytes and a data part (payload) of 18 bytes. In the data part, the very data of the information acquired by the information acquisition unit 11 is divided and stored. The packet identifier includes a start bit, an end bit, a sequence number, and a valid packet size.

First, the start bit is a bit that is set to 1 if the packet is the first packet of the entire data to be transmitted, and 0 if not. For example, in the example of FIG. 2, the start bit of the packet 0 included in the block 1 is 1, and the start bits of all the other packets are 0.

Next, the end bit is a bit that is set to 1 if the packet is the last packet of the entire data to be transmitted, and 0 if not. For example, in the example of FIG. 2, the end bit of the packet 19 included in the block 3 is 1, and the end bits of all the other packets are 0.

The sequence number is a number indicating the order of the packets included in each block. For example, the sequence number of the packet 0 included in the block 0 is 0, and the sequence number of the packet 1 included in the block 0 is 1. In this example, since the sequence numbers are allocated as series numbers in each block, the sequence number of the packet 0 included in the block 1 and the sequence number of the packet 0 included in the block 2 are 0, too.

The valid packet size is the size of valid data included in the data part. In this example, since the data part is 18 bytes, the maximum valid packet size is 18 bytes. However, the valid packet size to be set need not be the maximum value. For example, if the valid packet size is less than 18 bytes, all the remaining bits may be set to 0 so that the overall size of the packet can coincide with 20 bytes.

In this embodiment, the communication unit 13 transmits such a plurality of blocks to the second information processing device 90 on a block basis. At this point, the plurality of packets included in each block is transmitted continuously.

In this case, if the second information processing device 90 transmits an acknowledge command to the first information processing device 80 every time the second information processing device 90 receives each packet, the first information processing device 80 waits for a response every time the first information processing device 80 transmits a packet. Therefore, it takes time to complete the transmission of all the data. This equals a fall in communication speed.

Thus, in this embodiment, the communication unit 13 (communication unit 150, later described) transmits a plurality of blocks, for example, on a block basis, with a first characteristic provided with a property of read with no acknowledge. That is, the communication unit 13 continuously transmits the packets 0 to 31 of the block 1 with the first characteristic, without waiting for a response from the second information processing device 90.

Meanwhile, the second information processing device 90 receives (each block of) the plurality of blocks with the first characteristic and transmits the receiving result of (each of) the blocks with a second characteristic provided with a property of write with acknowledge, to the first information processing device 80. That is, the second information processing device 90 transmits the receiving result (acknowledge command) of each block on a block basis, instead of transmitting an acknowledge command on a packet basis.

The communication unit 13 of the first information processing device 80 receives the receiving result of (each of) the blocks in the external device 50 (second information processing device 90, or information processing device 200, later described), with the second characteristic.

If the communication unit 13 receives an acknowledge command to the transmission of (each of) the blocks with the second characteristic as the receiving result, the communication unit 13 determines that the reception of (each of) the blocks by the external device 50 (second information processing device 90) is successful. Since the second characteristic is provided with the property of write with acknowledge, the communication unit 13 subsequently sends back an acknowledge command indicating that the receiving result of the blocks is received normally, with the second characteristic.

As described above, the first information processing device 80 transmits information to the second information processing device 90 on a block basis, and the first information processing device 80 receives the receiving result of each block on a block basis. That is, as the first information processing device 80 simply receives a receiving result once, it is possible to determine whether transmission of a plurality of packets is successful or not, or the like. Therefore, the response waiting time can be reduced and the transfer time of each block can be shortened.

Also, since a sequence number is allocated to each packet, as described above, the data stored in the data part of each packet can be connected together in order of sequence numbers after reception, to restore the original data.

Thus, it is possible to transmit and receive, via near field communication, data of a second data volume that is greater than a first data volume that can be transmitted and received according to the standard profile of near field communication.

Next, a flow of specific processing of an upload sequence will be described, using the sequence chart of FIG. 4. In the specific example of FIG. 4, the blocks 1 to 3 of FIG. 2 are transmitted from a measurement device (first information processing device 80) to a smartphone (second information processing device 90).

First, when the communication unit 13 is in a state where transmission of the information is possible, the communication unit 13 transmits an upload data size of the information with a third characteristic provided with the property of read with acknowledge (Indicate), to the external device 50 (T101).

Specifically, using a characteristic with a name of Upload Data Size as the third characteristic, information that the data size of the block 1 is 640 bytes, that the data size of the block 2 is 640 bytes, and that the data size of the block 3 is 400 bytes, is transmitted from the measurement device to the smartphone (T101).

Then, if the communication unit of the smartphone successfully receives the upload data size normally, the communication unit of the smartphone transmits an acknowledge command with the same characteristic of Upload Data Size, to the measurement device (T102).

Thus, it is possible to receive information that the external device 50 accepts the start of transmission, or the like, as well as to report the start of the transmission of data and the upload data size.

Next, the communication unit 13 of the measurement device transmits the block 1 with a first characteristic with a name of Upload Data (T103), as described above. Since this Upload Data is provided with a property of read with no acknowledge (Notification), the smartphone need not transmit an acknowledge command every time the smartphone receives a packet from the measurement device side, as described above.

Therefore, after receiving the block 1, the communication unit of the smartphone transmits an acknowledge command indicating that the block 1 is received normally (receiving result of the block 1) with a second characteristic with a name of Upload Order (T104). This example is the case where all the packets 0 to 31 included in the block 1 are successfully received normally. Also, since this Upload Order is provided with a property of write with acknowledge (Write With Response), the communication unit 13 of the measurement device sends back a further acknowledge command if the receiving result is successfully received normally (T105).

Next, also in the transmission and reception of the block 2, the communication unit 13 of the measurement device similarly transmits the block 2 with Upload Data (T106). Then, the communication unit of the smartphone transmits a receiving result with a characteristic of Upload Order (T107). In response to this, the measurement device sends back an acknowledge command (T108). The transmission and reception of the block 3 is similarly carried out (T109 to T111).

Figure 4:
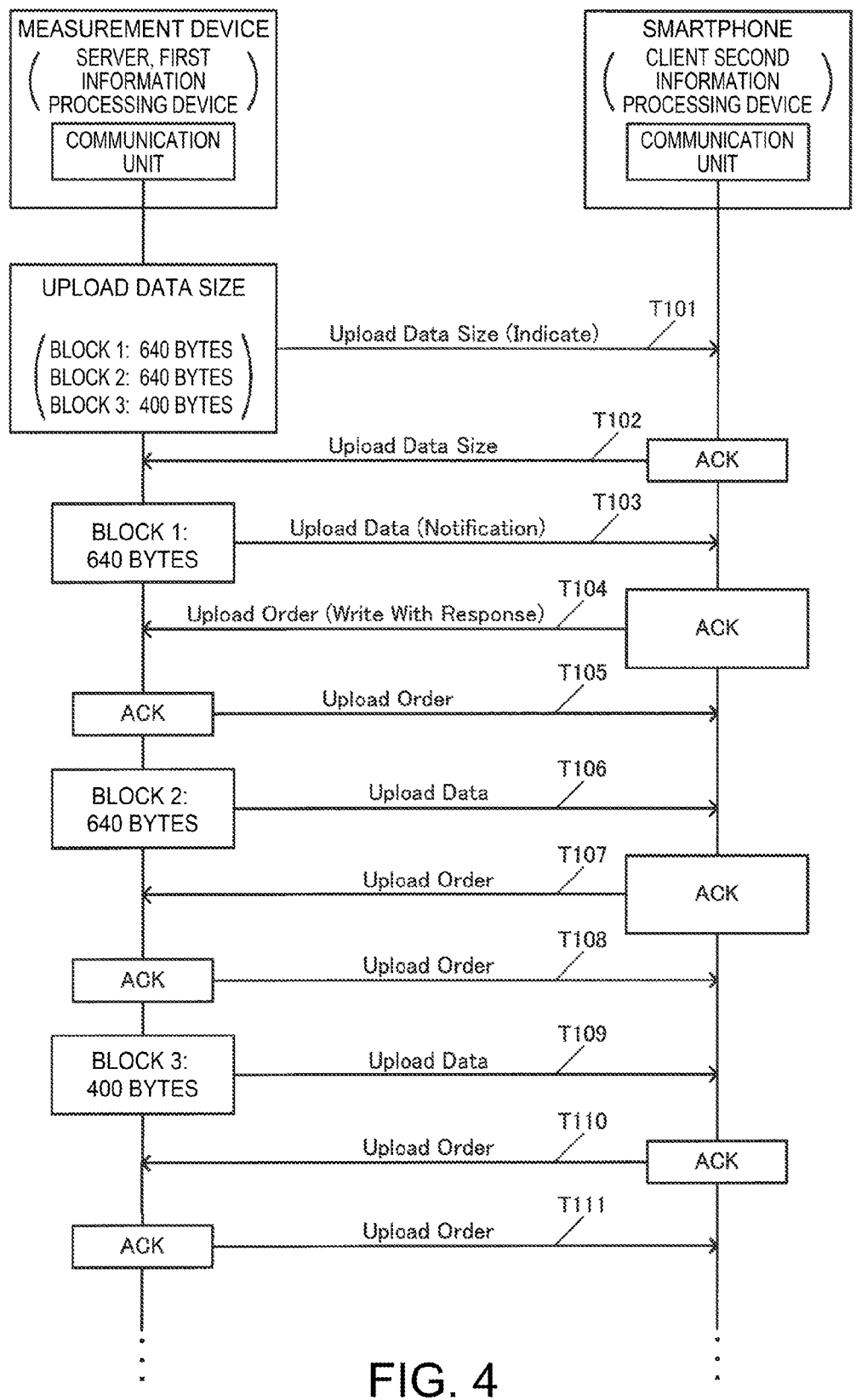
FIG. 4 shows a sequence view illustrating a flow of processing of an upload sequence.

In the example of FIG. 4 described above, each of the blocks 1 to 3 is successfully received normally in one round of transmission. However, there are cases where each block cannot be received normally. In such cases, the block is retransmitted. A flow of processing in such cases is shown in the sequence chart of FIG. 5. T201 to T203 are similar to T101 to T103 of FIG. 4 and therefore will not be described further.

In this example, it is assumed that the communication unit 13 of the measurement device transmits the packet 0 with a sequence number 0x00 to the packet 31 with a sequence number 0x1F included in the block 1, and that the smartphone consequently fails to receive the packet 9 with a sequence number 0x09.

In this case, the communication unit of the smartphone transmits the sequence number (here, 0x09) of the first packet that fails to be received, with the foregoing characteristic of Upload Order, to the measurement device (T204). In response to this, the communication unit 13 of the measurement device sends back an acknowledge command if the communication unit 13 successfully receives the sequence number normally (T205).

Then, if the communication unit 13 receives a sequence number indicating a packet of the plurality of packets included in (each of) the blocks that are transmitted, with the second characteristic (Upload Order) as the receiving result of (each of) the blocks, the communication unit 13 retransmits packets of the plurality packets, starting with the packet corresponding to the sequence number (T206).

That is, in this example, since the communication unit 13 receives the sequence number 0x09, the communication unit 13 retransmits the packets with the sequence number 0x09 and onwards, that is, the packet 9 with the sequence number 0x09 to the packet 31 with the sequence number 0x1F, with the characteristic of Upload Data (T206).

Thus, it is possible to transmit only the packets after the receiving failure occurs, or the like, instead of retransmitting all of the plurality of packets included in each block.

In this example, even if, for example, the smartphone successfully receives the packets with the sequence number 0x0A and onwards normally, all the packets with the sequence number 0x09 and onward are retransmitted. Thus, it is possible to restrain the data volume transmitted from the smartphone to the measurement device when retransmission is requested.

Then, as the block 1 is retransmitted, if the communication unit of the smartphone successfully receives all of the retransmitted packets normally, the communication unit of the smartphone transmits a receiving result with the characteristic of Upload Order to the measurement device (T207). The communication unit 13 of the measurement device sends back an acknowledge command (T208). The subsequent processing flow is similar to T106 and onward of FIG. 4.

2.4. Download Sequence

Next, a download sequence using a unique profile will be described. First, a communication system in this example is illustrated in FIG. 1B. The communication system in this example includes a first information processing device 80 which acquires information, and a second information processing device 90 which communicates with the first information processing device 80 via near field communication. The first information processing device 80 is equivalent to the external device 50 (client, for example, smartphone or another smart device). The second information processing device 90 is equivalent to the information processing device 10 (server, for example, health care device, biological information device, or measurement device).

In this way, in a download sequence, the roles of the server and the client in the foregoing case of the upload sequence are reversed. However, there is no difference in that data is transmitted in a lump on a block basis and that a receiving result on a block basis is sent back in one round of transmission. Therefore, overlapping descriptions about these features will be omitted properly. The first to third characteristics used in the description below are different from the characteristics described in the explanation of the upload sequence.

Specifically, in the download sequence according to this embodiment, the first information processing device (smartphone) divides data of information to be transmitted, into a plurality of blocks, each including a plurality of packets, as shown in FIG. 2 described above. Next, the first information processing device transmits the plurality of blocks, for example, on a block basis, with a first characteristic provided with a property of write with no acknowledge, to the second information processing device (measurement device).

Then, the communication unit 13 of the second information processing device receives the plurality of blocks, for example, on a block basis, with the first characteristic. The communication unit 13 also transmits a receiving result of (each of) the blocks with a second characteristic provided with a property of read with acknowledge, to the first information processing device. The first information processing device receives the receiving result with the second characteristic.

Thus, as in the case of the upload sequence, the second information processing device need not send back an acknowledge command every time the second information processing device receives a packet. Therefore, the time until the transmission of each block is completed can be shortened.

Also, since a sequence number is allocated to each packet of each block, it is possible to transmit and receive, via near field communication, data of a second data volume that is greater than a first data volume that can be transmitted and received according to the standard profile of near field communication, on the basis of a similar principle to that of the upload sequence.

Figure 6:
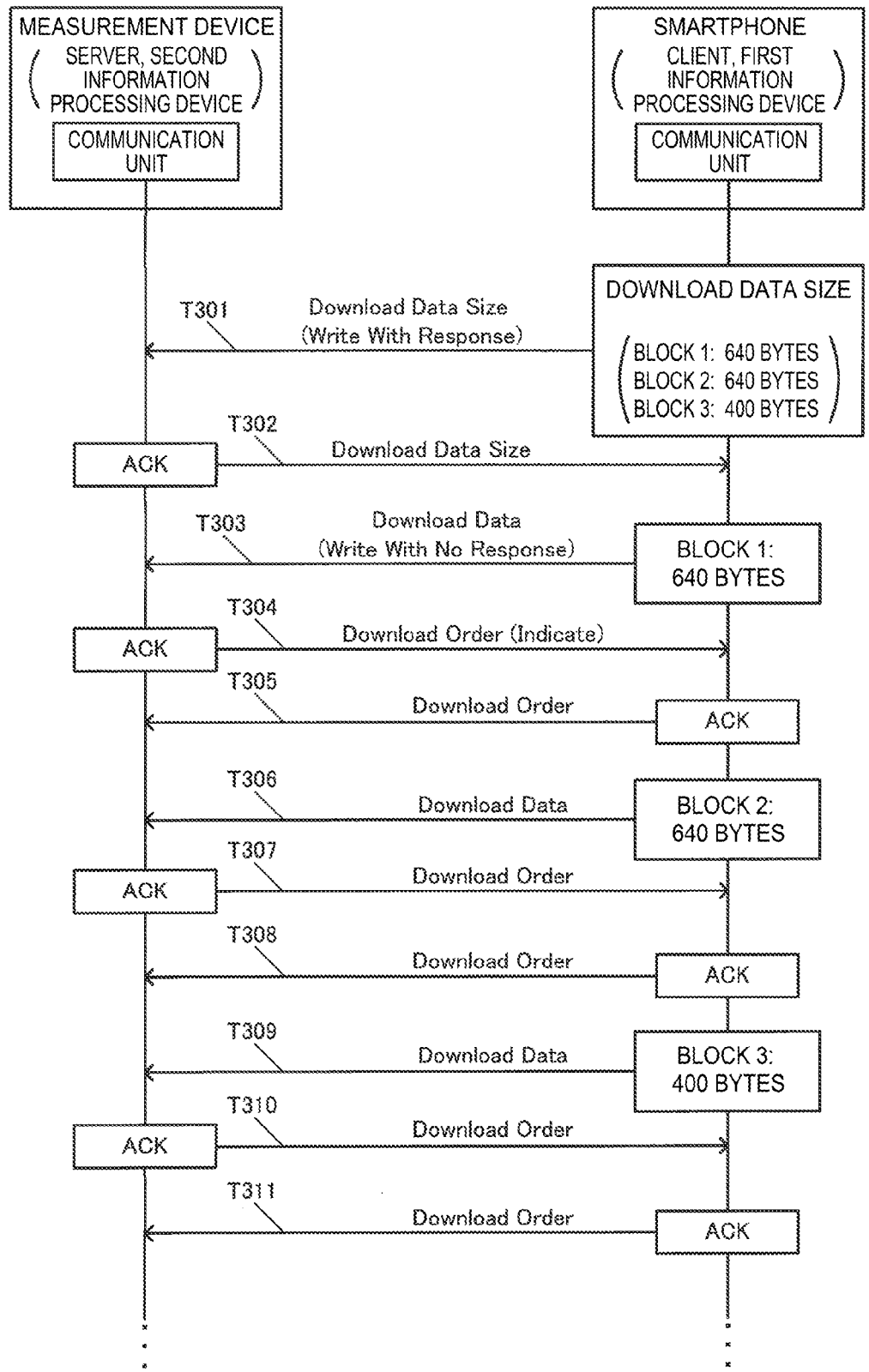
FIG. 6 is a sequence chart illustrating a flow of processing of a download sequence.
Figure 7:
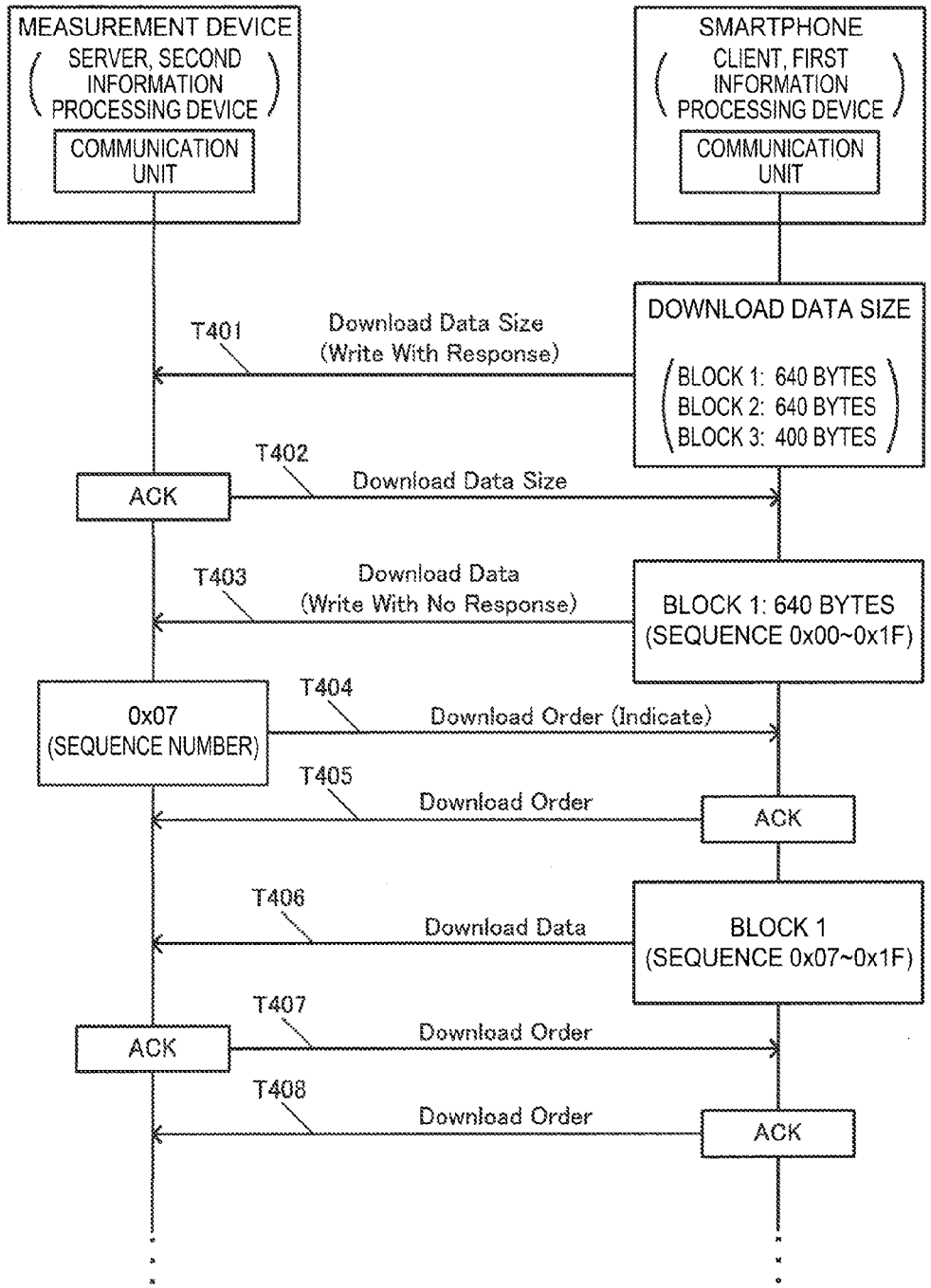
FIG. 7 is another sequence chart illustrating a flow of processing of a download sequence.

Next, a flow of specific processing of the download sequence will be described, using the sequence chart of FIG. 6. In the specific example of FIG. 6, the blocks 1 to 3 are transmitted from the smartphone (first information processing device 80) to the measurement device (second information processing device 90).

First, when the communication unit of the smartphone in a state where transmission of the information is possible, the communication unit of the smartphone transmits a download data size of information with a third characteristic provided with a property of write with acknowledge (Write With Response), to the measurement device (T301).

Specifically, using a characteristic with a name of Download Data Size as the third characteristic, information that the data size of the block 1 is 640 bytes, that the data size of the block 2 is 640 bytes, and that the data size of the block 3 is 400 bytes, is transmitted from the smartphone to the measurement device (T301).

Then, if the communication unit 13 of the measurement device successfully receives the download data size normally, the communication unit 13 transmits an acknowledge command with the same characteristic of Download Data Size, to the smartphone (T302).

Thus, the measurement device can receive the start of the transmission of data and the download data size, and can also report information that the measurement device accepts the start of transmission, to the smartphone, or the like.

Next, the communication unit of the smartphone transmits the block 1 with a first characteristic with a name of Download Data (T303), as described above. Since this Download Data is provided with a property of write with no acknowledge (Write With No Response), the measurement device need not transmit an acknowledge command every time the measurement device receives a packet from the smartphone, as described above.

Therefore, after receiving the block 1, the communication unit 13 of the measurement device transmits an acknowledge command indicating that the block 1 is received normally (receiving result of the block 1) with a second characteristic with a name of Download Order (T304). This example is the case where all the packets 0 to 31 included in the block 1 are successfully received normally. Also, since this Download Order is provided with a property of read with no acknowledge (Indicate), the communication unit of the smartphone sends back a further acknowledge command with the characteristic of Download Order if the receiving result is successfully received normally (T305).

Next, also in the transmission and reception of the block 2, the communication unit of the smartphone similarly transmits the block 2 with the characteristic of Download Data (T306). Then, the communication unit 13 of the measurement device transmits a receiving result with a characteristic of Download Order (T307). In response to this, the smartphone sends back an acknowledge command (T308). The transmission and reception of the block 3 is similarly carried out (T309 to T311).

In the download sequence, as in the upload sequence, there are cases where the communication unit 13 of the measurement device cannot receive each block normally and therefore the smartphone retransmits the block. A flow of processing in such cases is shown in the sequence chart of FIG. 7. T401 to T403 are similar to T301 to T303 of FIG. 6 and therefore will not be described further.

In this example, it is assumed that the communication unit of the smartphone transmits the packet 0 with a sequence number 0x00 to the packet 31 with a sequence number 0x1F included in the block 1, and that the communication unit 13 of the measurement device consequently fails to receive the packet 7 with a sequence number 0x07.

In this case, the communication unit 13 of the measurement device transmits the sequence number corresponding to the packet that fails to be received, of the plurality of packets included in (each of) the blocks that are transmitted, with the second characteristic as a receiving result (T404). Specifically, the communication unit 13 of the measurement device transmits the sequence number (here, 0x07) of the first packet that fails to be received, with the foregoing characteristic of Download Order, to the smartphone (T404).

Thus, it is possible to report the sequence number of the first packet that fails to be received, to the smartphone (external device 50), or the like.

In response to this, the communication unit of the smartphone sends back an acknowledge command if the communication unit of the smartphone successfully receives the sequence number normally (T405).

Then, the communication unit of the smartphone retransmits packets of the plurality packets, starting with the packet corresponding to the received sequence number (T406). Specifically, in this example, since the communication unit of the smartphone receives the sequence number 0x07, the communication unit of the smartphone retransmits the packets with the sequence number 0x07 and onwards, that is, the packet 7 with the sequence number 0x07 to the packet 31 with the sequence number 0x1F, with the characteristic of Download Data (T406).

If, in response to this, the communication unit 13 of the measurement device transmits a sequence number indicating a packet of the plurality of packets included in (each of) the blocks that are received, with the second characteristic as a receiving result (T404), the communication unit 13 of the measurement device receives the plurality of packets again, starting with the packet corresponding to the sequence number (T406).

Thus, it is possible to receive again only the packets after the packet receiving failure occurs, or the like, instead of receiving again all of the plurality of packets included in each block. In this example, as in the upload sequence, for example, even if the measurement device successfully receives the packets with the sequence number 0x08 and onward normally, the measurement device is to receive again all the packets with the sequence number 0x07 and onward.

Then, as the communication unit 13 of the measurement device receives the block 1 again, if the communication unit 13 of the measurement device successfully receives all of the retransmitted packets normally, the communication unit 13 of the measurement device transmits a receiving result with the characteristic of Download Order to the smartphone (T407). The communication unit of the smartphone sends back an acknowledge command (T408). The subsequent processing flow is similar to T306 and onward of FIG. 6.

Also, if near field communication is carried out between the health care device and the smartphone according to the above download sequence, it is possible update the firmware of the health care device, or the like, via the smartphone.

2.5. Communication Speed Change Sequence

Figure 8:
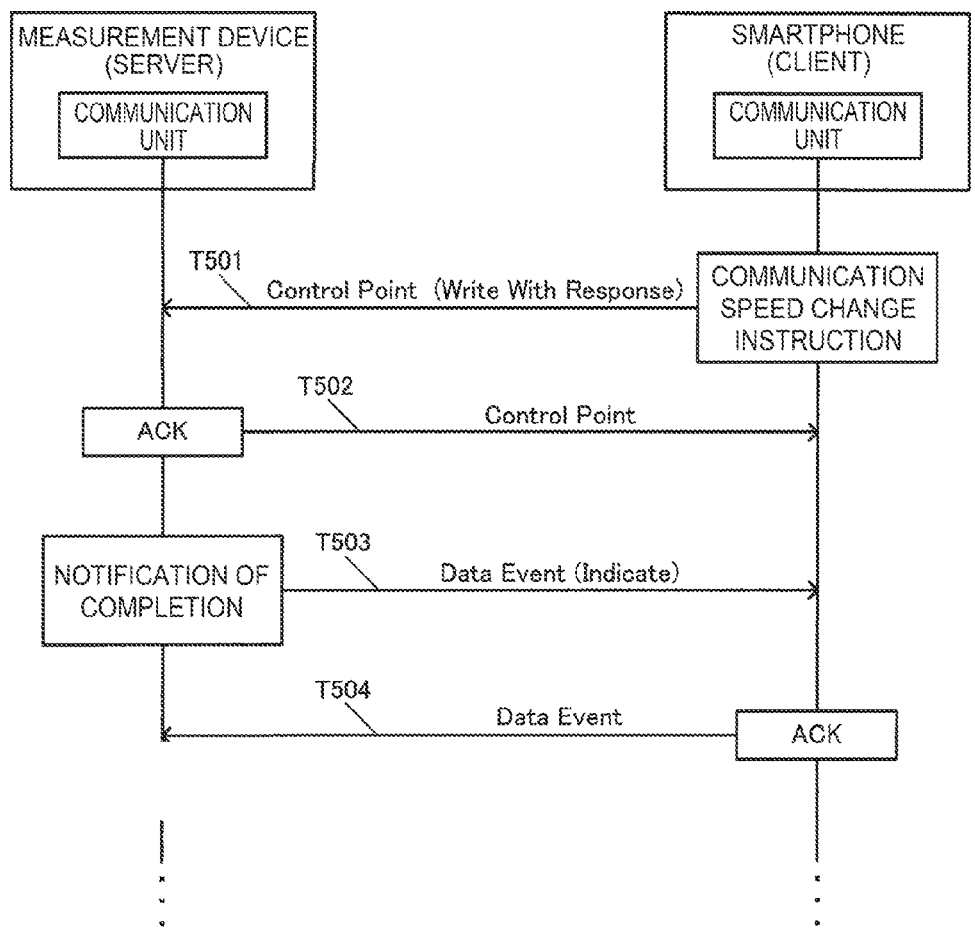
FIG. 8 is a sequence chart illustrating a flow of processing of a communication speed change sequence.

Next, a communication speed change sequence will be described, using the sequence chart of FIG. 8. The communication speed change sequence is carried out, using the same sequence for both upload and download.

First, the communication unit of the smartphone transmits a communication speed change instruction with a fourth characteristic provided with a property of write with acknowledge, to the measurement device (T501). In this example, a characteristic with a name of Control Point is used as the fourth characteristic.

This communication speed change instruction may be information indicating the communication speed after change, or may be, for example, mode switching information used to switch between a low-speed mode and a high-speed mode that are set in advance. If the mode switching information is used as the communication speed change instruction, the communication speed in the low-speed mode and the communication speed in the high-speed mode are set in advance.

In response to this, the communication unit 13 of the measurement device receives the communication speed change instruction with the fourth characteristic (Control Point) provided with the property of write with acknowledge (T501), and sends back an acknowledge command indicating that the communication speed change instruction is received normally, with Control Point (T502).

Then, the communication unit 13 changes the communication speed on the basis of the received communication speed change instruction and transmits a communication speed change completion notification with a fifth characteristic provided with a property of read with acknowledge (Indicate) (T503). In this example, a characteristic with a name of Data Event is used as the fifth characteristic.

Finally, if the communication unit of the smartphone successfully receives the communication speed change completion notification normally, the communication unit of the smartphone sends back an acknowledge command to that effect with Data Event (T504). The processing then ends.

Thus, it is possible to carry out communication at the communication speed indicated by the received communication speed change instruction, or the like.

3. Application Example

Next, an example in which first biological information is transmitted on the basis of the standard profile and in which second biological information is transmitted on the basis of a unique profile, will be described.

3.1. Example of System Configuration

Figure 9:
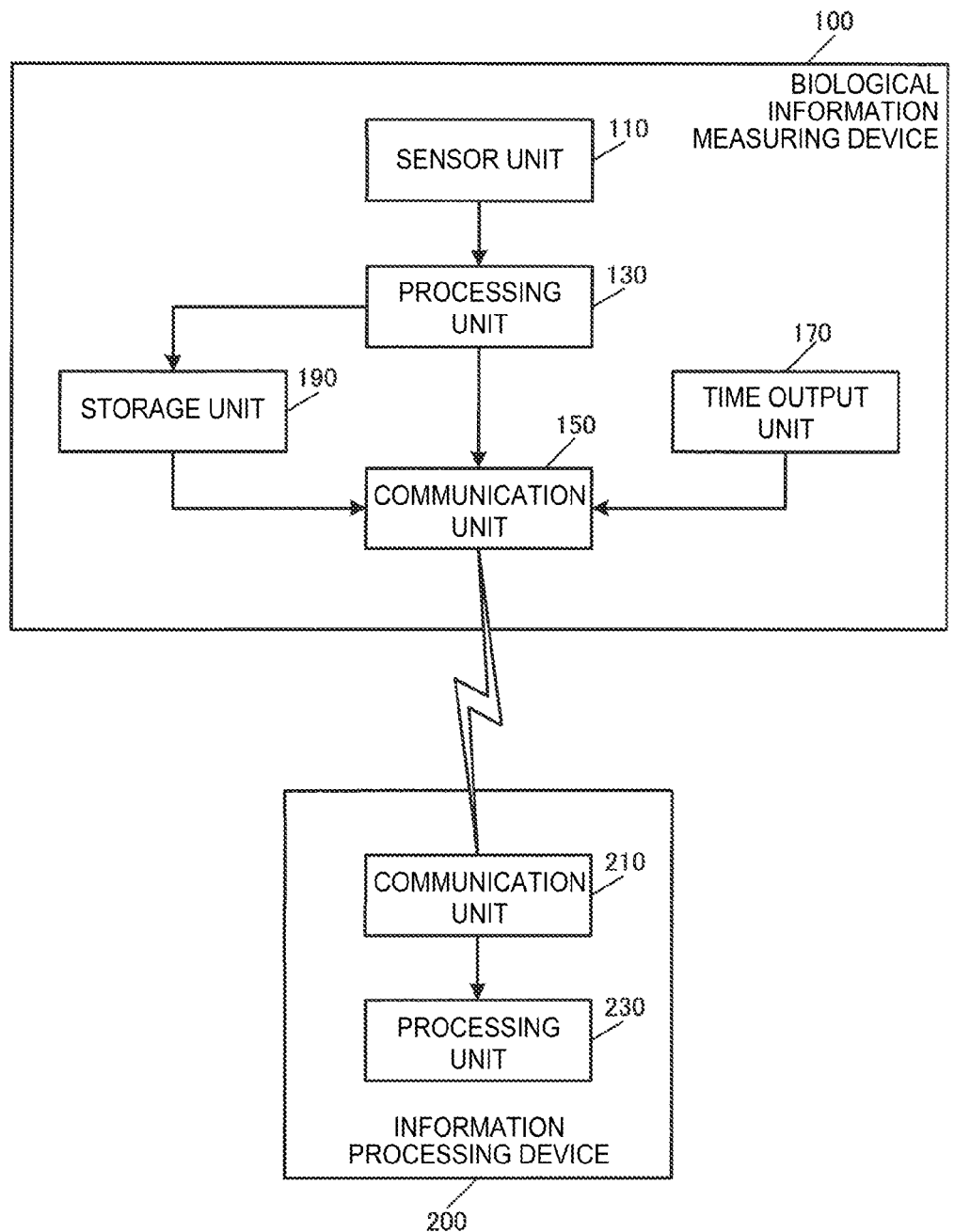
FIG. 9 shows an example of the system configuration of a biological information measuring device, an information processing device, and a communication system including these devices.

First, FIG. 9 shows an example of the configuration of a biological information measuring device 100, an information processing device 200, and a biological information measurement system including these devices. The biological information measuring device 100 includes a sensor unit 110, a processing unit 130, a communication unit 150, a time output unit 170, and a storage unit 190. Meanwhile, the information processing device 200 includes a communication unit 210 and a processing unit 230. The biological information measuring device 100 is equivalent to the information processing device 10 of FIG. 1A. The information processing device 200 is equivalent to the external device 50 of FIG. 1A.

The biological information measuring device 100, the information processing device 200, and the biological information measurement system including these devices are not limited to the configuration of FIG. 9 and can be modified in various manners, such as omitting a part of the components or adding another component. Also, a part or all of the functions of the information processing device 200 may be realized by a server connected to the biological information measuring device 100 or the information processing device 200 via communication.

Next, each unit in the biological information measuring device 100 will be described.

First, the sensor unit 110 may be, for example, a pulse wave sensor, temperature sensor, body motion sensor or the like. The sensor unit 110 may not necessarily be configured with a single sensor and may include a plurality of kinds of sensors. If the sensor unit 110 includes a plurality of kinds of sensors, the respective sensors may be provided at different positions (sites) in the biological information measuring device 100.

Here, the pulse wave sensor is a sensor for detecting a pulse wave sensor signal, for example, a photoelectric sensor or the like. However, the use of a photoelectric sensor as the pulse wave sensor is not limiting. Other sensor such as a sensor using ultrasonic waves may also be used.

As the body motion sensor, a motion sensor (acceleration sensor), pressure sensor (contact pressure sensor) or the like is used. Moreover, a plurality of kinds of sensors may be provided as the body motion sensor.

Next, the processing unit 130 detects biological information (first biological information and second biological information) on the basis of sensor information obtained from the sensor unit 110. The processing unit 130 of FIG. 9 is equivalent to the information acquisition unit 11 of FIG. 1A.

The communication unit 150 transmits biological information (first biological information and second biological information) to the information processing device 200. The communication unit 150 of FIG. 9 is equivalent to the communication unit 13 of FIG. 1A. The functions of the processing unit 130 and the communication unit 150 can be realized by hardware such as various processors (CPU or the like) and ASIC (gate array or the like), or by a program.

The time output unit 170 outputs time. The function of the time output unit 170 is realized, for example, using a hardware timer or the like.

The storage unit 190 accumulates (logs) and stores biological information (second biological information). Also, the storage unit 190 serves as a work area for the processing unit 130, the communication unit 150 or the like, and the function thereof can be realized by a memory such as RAM, or by an HDD or the like.

Next, each unit in the information processing device 200 will be described.

First, the communication unit 210 carries out near field communication with the communication unit 150 of the biological information measuring device 100 and thus acquires biological information.

The processing unit 230 carries out various kinds of processing based on the biological information or the like received by the communication unit 210. For example, the processing unit 230 carries out processing to display the acquired biological information on an external display unit, or the like. The functions of the communication unit 210 and the processing unit 230 can be realized by hardware such as various processors (CPU or the like) and AISC (gate array or the like), or by a program.

3.2. Details of Processing

In this embodiment, the information transmitted from the biological information measuring device 100 to the information processing device 200 is biological information. As described above, the biological information includes first biological information for which a transmitting/receiving method is prescribed by the standard profile of a communication standard (BLE) of near field communication, and second biological information for which a transmitting/receiving method is not prescribed by the standard profile of the communication standard (BLE).

Figure 10:
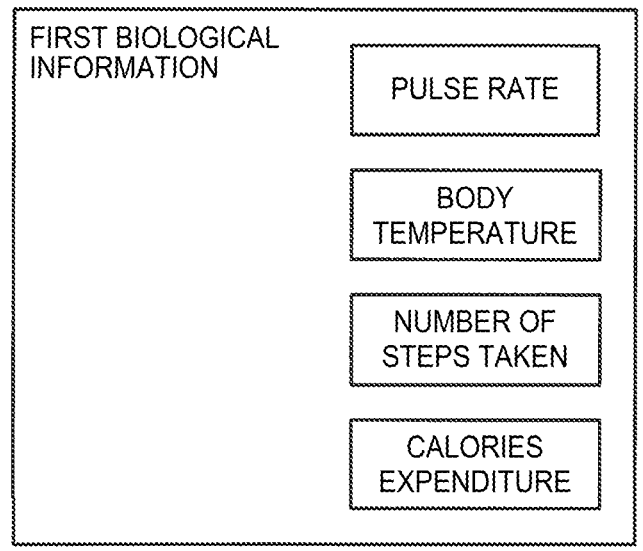
FIG. 10 is an explanatory view of first biological information and second biological information.
Figure 10:
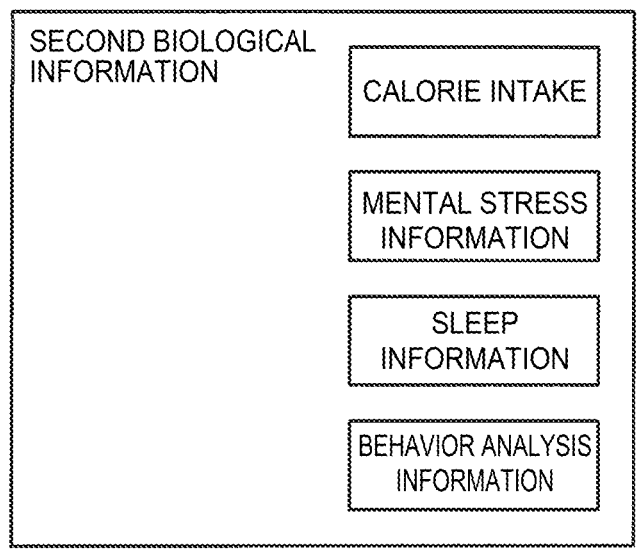

Specifically, the first biological information includes pulse rate, body temperature, number of steps taken, and calorie expenditure or the like, as shown in FIG. 10. Meanwhile, the second biological information includes at least one of calorie intake, mental stress information, sleep information, and behavior analysis information.

Thus, it is possible to transmit the biological information of a subject to the information processing device 200, or the like.

In the embodiment, the communication unit 150 of the biological information measuring device 100 transmits the first biological information on the basis of the standard profile according to the communication standard of the communication carried out by the communication unit 150, and transmits the second biological information on the basis of a unique profile according to the above communication standard.

Thus, it is possible to transmit not only the first biological information but also the second biological information, which cannot be transmitted according to the standard profile, or the like.

The communication standard used in this embodiment is a near field communication standard, and the standard profile is a standardized profile according to the near field communication standard. More specifically, the near field communication standard is the BLE.

Thus it is possible to transmit and receive biological information according to the near field communication standard, or the like. Specifically, the first biological information can be transmitted and received according to the standard profile defined by the BLE.

Figure 5:
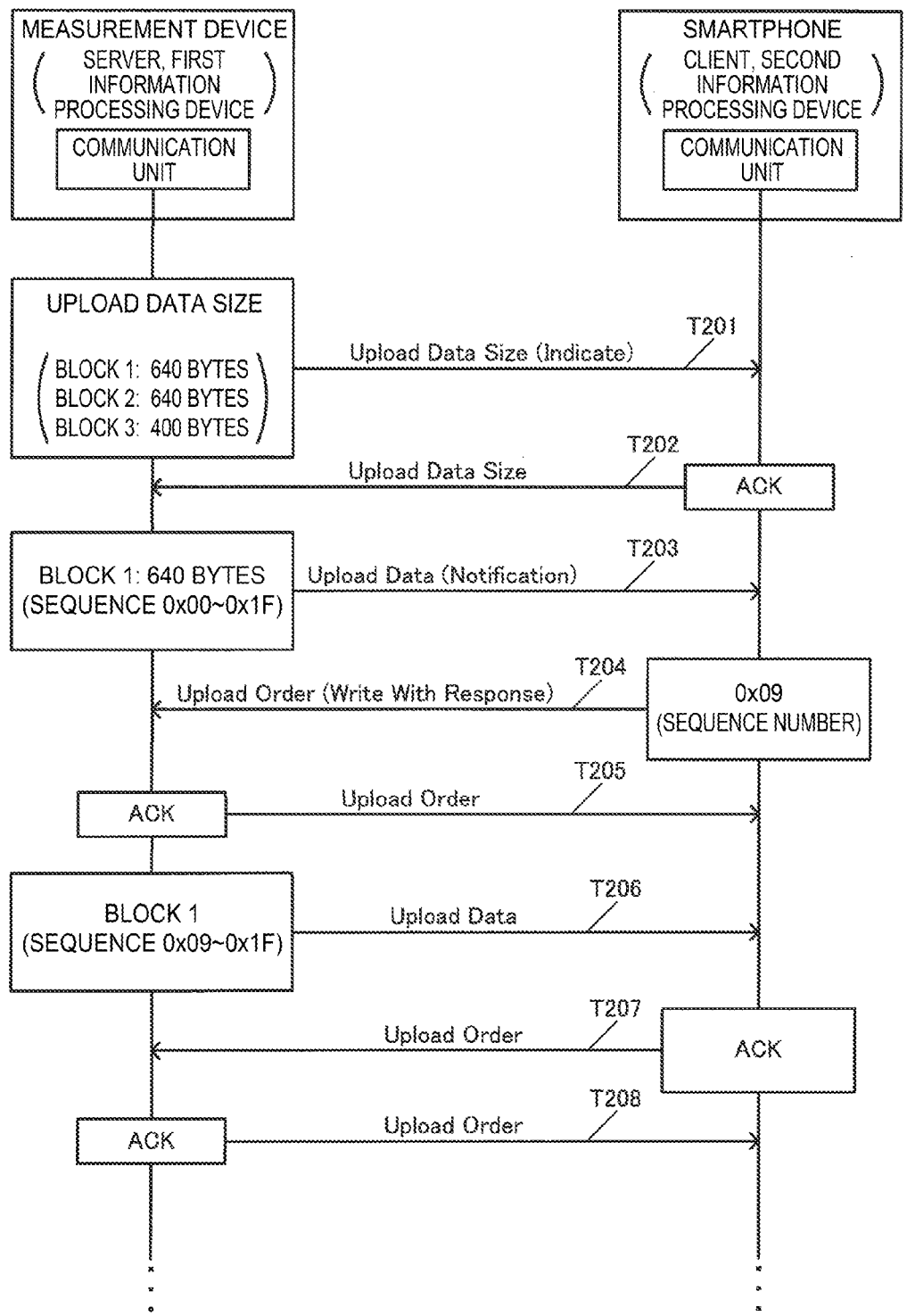
FIG. 5 is another sequence chart illustrating a flow of processing of an upload sequence.

In the case where the biological information measuring device 100 transmits the second biological information to the information processing device 200 according to the unique profile, the processing of the upload sequence described mainly with reference to FIGS. 4 and 5 is carried out. Specifically, the communication unit 150 divides the data of the second biological information into a plurality of blocks, each including a plurality of packets, and transmits the plurality of blocks, for example on a block basis, as described above.

Thus, it is possible to transmit and receive, via near field communication, data (data of the second biological information) of a second data volume that is greater than a first data volume that can be transmitted and received according to the standard profile of near field communication.

The communication unit 150 of the biological information measuring device 100 transmits the first biological information in a first communication cycle, and transmits the second biological information stored in the storage unit 190 in a second communication cycle that is longer than the first communication cycle.

More specifically, the communication unit 150 transmits the first biological information with the first data volume at (each) transmission timing in the first communication cycle, and transmits the second biological information with the second data volume, which is greater than the first data volume, at (each) transmission timing in the second communication cycle.

Then, the communication unit 210 of the information processing device 200 receives the first biological information in the first communication cycle, and receives the second biological information in the second communication cycle.

Thus, it is possible to transmit and receive the first biological information, and transmit and receive the second biological information in a lump at a predetermined timing, or the like, while achieving a real time property.

Figure 11:
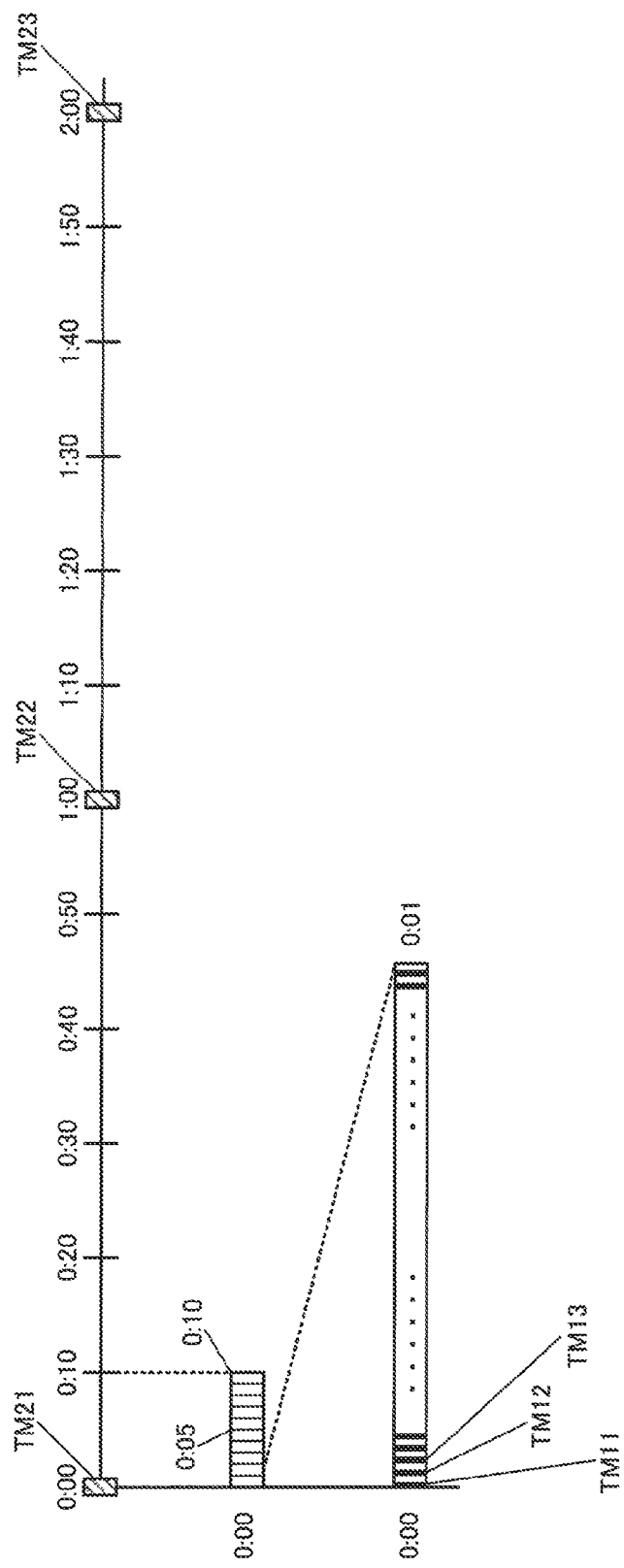
FIG. 11 is an explanatory view of a first communication cycle and a second communication cycle.

A specific example is shown in FIG. 11. FIG. 11 shows each transmission timing in the first communication cycle and each transmission timing in the second communication cycle, with the horizontal axis representing time. In this example, the first communication cycle is 1 second, and the second communication cycle is 1 hour.

In this case, in this example, precisely the time 0:00 is the first transmission timing TM21 in the second communication cycle. The subsequent second transmission timing T22 is the time 1:00, which is an hour later.

The second row in FIG. 11 shows an extraction of the time bracket from the time 0:00 to the time 0:10 on the first row in FIG. 11. The third row in FIG. 11 shows an enlarged extraction of the time bracket from the time 0:00 to the time 0:01 on the second row in FIG. 11. In this example, as shown on the third row in FIG. 11, precisely the time 0:00:00 is the first transmission timing TM11 in the first communication cycle. The time 0:00:01, which is a second later, is the second transmission timing TM12.

In this embodiment, as shown in the example of FIG. 11, the second communication cycle is longer than the first communication cycle. Therefore, processing to continuously transmit the second biological information with a greater data volume in a short communication cycle need not be carried out. As a result, it is possible to maintain the power saving property of the BLE, or the like, while transmitting the second biological information from the biological information measuring device 100 to the information processing device 200.

In order to communicate at the transmission timings as shown in FIG. 11, the communication unit 150 determines a transmission timing of the second biological information on the basis of the time outputted from the time output unit 170, and transmits the second biological information at the determined transmission timing.

Thus, it is possible to transmit and receive data in a predetermined communication cycle, or the like.

Also, in this example, the detection cycle of the first biological information is set at an interval of one second, which is the same as the first communication cycle. Therefore, the information processing device 200 can regard the received first biological information as information detected at the time when the information is received. Regarding the information as such does not pose any problem because the first communication cycle is sufficiently short.

Meanwhile, the detection cycle of the second biological information is often a shorter cycle than the second communication cycle. For example, the detection cycle of the second biological information may be the same cycle as the detection cycle of the first biological information. Therefore, even if only the second biological information is transmitted in the second communication cycle, the information processing device 200 cannot determine when the received second biological information is detected.

Thus, the storage unit 190 of the biological information measuring device 100 associates, accumulates (logs) and stores the second biological information with measurement time outputted from the time output unit 170. The measurement time is the time outputted from the time output unit 170 at the timing when biological information is detected.

Thus, the information processing device 200 can specify the measurement time of the received second biological information, or the like.

The storage unit 190 may associate, accumulate (log) and store not only the second biological information but also the first biological information with the measurement time. For example, after the communication between the biological information measuring device 100 and the information processing device 200 is disconnected and subsequently reconnected, the communication unit 150 may transmit the first biological information that is stored in the storage unit 190 and not transmitted during the disconnection of the communication, to the information processing device 200 according to the unique profile. In this case, the communication unit 150 may transmit not only the first biological information but also the measurement time associated and stored with the first biological information. That is, the second biological information may include the first biological information accumulated in the storage unit 190.

Thus, it is possible to transmit the first biological information detected during the disconnection of the communication with the information processing device 200, in a lump after reconnection, or the like. Also, the information processing device 200 can specify the measurement time of the first biological information detected during the disconnection of the communication, or the like.

The second biological information measured and recorded by the biological information measuring device 100 is transmitted from the biological information measuring device 100 to the information processing device 200 (smartphone) and subsequently transmitted from the information processing device 200 to the web server.

Specifically, as described using FIG. 11, the biological information measuring device 100 transmits the second biological information obtained during the past one hour, to the information processing device 200 every hour on the hour sharp. The information processing device 200 receives the second biological information from the biological information measuring device 100 and subsequently uploads the second biological information to the web server.

In this case, since uploading to the web server from all the information processing devices 200 used in the market is carried out at the same timing, load concentration on the web server occurs, posing a risk of serious trouble.

Thus, in this embodiment, the transmission timing of the second biological information is shifted so that different biological information measuring devices 100 have different transmission timings. This prevents the information processing devices 200 from simultaneously uploading the second biological information to the web server at the same timing.

Specifically, the communication unit 150 of the biological information measuring device 100 finds a delay time of the transmission timing of biological information on the basis of device-specific information. The communication unit 150 then finds a first transmission timing on the basis of the time outputted from the time output unit 170 and transmits the biological information (second biological information) at a second transmission timing that is delayed from the first transmission timing by the resulting delay time.

The communication unit 210 of the information processing device 200 receives the biological information (second biological information) at the second transmission timing.

Here, as the device-specific information, a unique circuit ID provided for each individual device when the biological information measuring device 100 is manufactured is used. The circuit ID is inputted to a hash function expressed by the following equation (1), to calculate a delay time DT. In the equation (1), IN represents the circuit ID and DT represents the delay time. In the case of this example, a delay time of 0 to 599 seconds can be generated.

$$DT=IN \bmod 600 \qquad (1)$$

Figure 12:
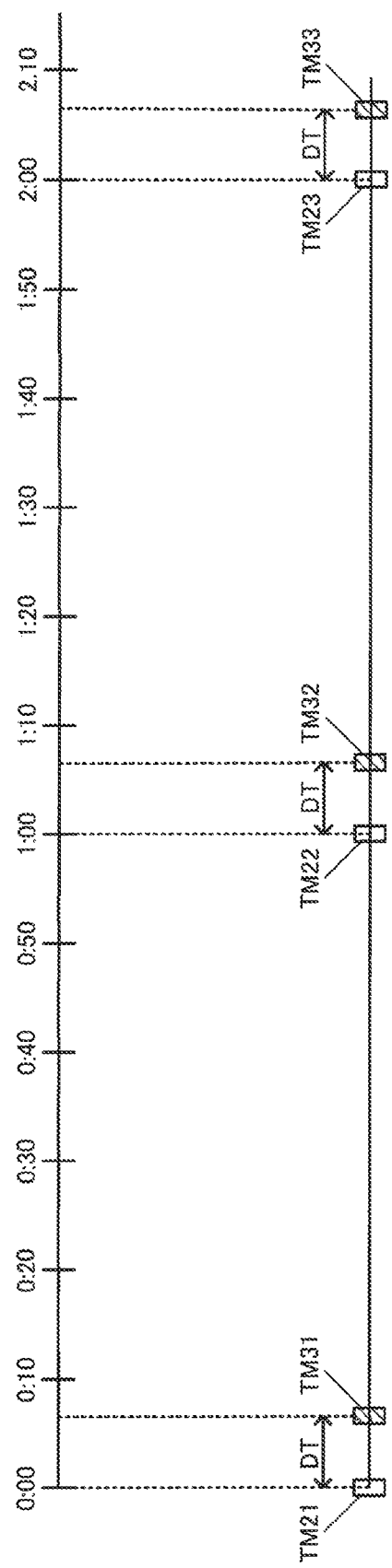
FIG. 12 is an explanatory view of transmission timings dispersed by a delay time.

The first transmission timing is, for example, every hour on the hour. In FIG. 12, the first transmission timing is timings TM21 to TM23.

As the second transmission timing, the time delayed from the first transmission timing by the resulting delay time DT is found. Specifically, in the example of FIG. 12, timings TM31 to TM33 are the second transmission timings.

As described above, since different biological information measuring devices 100 have different circuit IDs (device-specific information), the delay time DT calculated on the basis of the hash function has dispersed values.

Thus, the timing of transmitting the second biological information to the information processing devices 200 is dispersed, and therefore the timing when the information processing devices 200 transmit the second biological information to the web server can be dispersed as well. Therefore, the load dispersion of the web server can be achieved.

Figure 13:
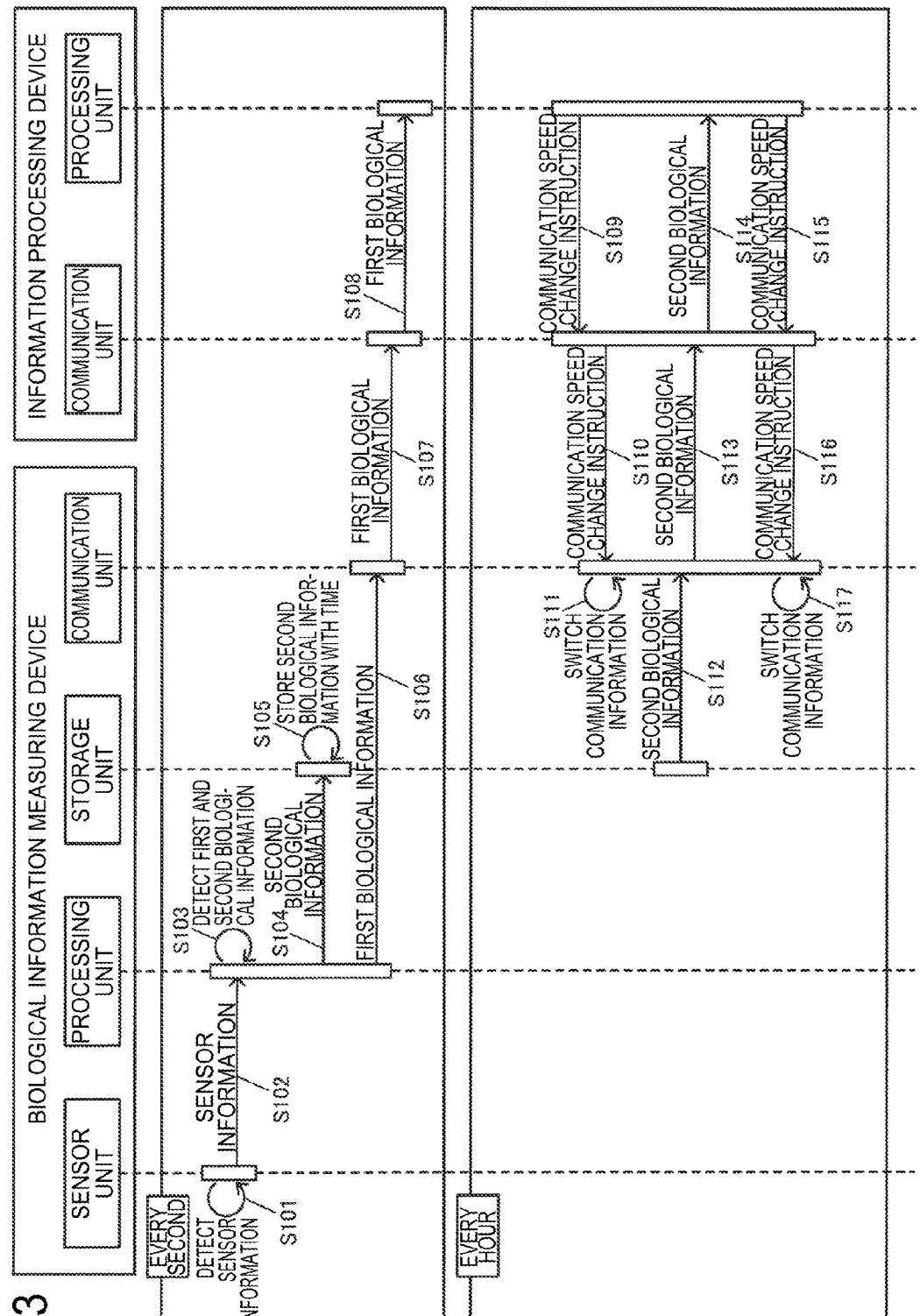
FIG. 13 is a sequence chart illustrating a flow of overall processing according to the embodiment.

Next, the flow of the processing of this embodiment will be described, using the sequence chart of FIG. 13.

First, the sensor unit 110 of the biological information measuring device 100 detects sensor information (S101) at a frequency of 1 second and reports the sensor information to the processing unit 130 (S102).

Next, the processing unit 130 detects first biological information and second biological information on the basis of the sensor information (S103). The storage unit 190 acquires the second biological information from the processing unit 130 (S104) and associates and stores the second biological information with the measurement time of the second biological information acquired from the time output unit 170 (S105).

Meanwhile, the communication unit 150 acquires the first biological information from the processing unit 130 (S106) and transmits the first biological information to the communication unit 210 of the information processing device 200 according to the standard profile of the BLE (S107). The processing unit 230 of the information processing device 200 then acquires the first biological information from the communication unit 210 (S108) and carries out various kinds of processing. Steps S104 and S105, and Steps S106 to S108 may be reversed in order or may be carries out in parallel. The above is the flow of a series of processes of transmission/reception processing for the first biological information. The processing of these Steps S101 to S108 is carried out every first communication cycle (first detection cycle).

Next, the processing unit 230 of the information processing device 200 gives an instruction to change the communication speed from a first communication speed to a second communication speed that is faster than the first communication speed, before receiving the second biological information. That is, the processing unit 230 reports a communication speed change instruction to change to the second communication speed, to the communication unit 210 (S109). Here, the first communication speed is the communication speed used at the time of transmitting the first biological information in Step S107.

The communication unit 210 of the information processing device 200 transmits the communication speed change instruction to the communication unit 150 of the biological information measuring device 100 (S110).

Meanwhile, the communication unit 150 of the biological information measuring device 100 changes the communication speed on the basis of the received communication speed change instruction (S111). That is, the communication unit 150 changes the communication speed from the first communication speed to the second communication speed, which is faster than the first communication speed, before transmitting the second biological information (S111).

The communication unit 150 then acquires the second biological information along with the measurement time from the storage unit 190 (S112). Moreover, the communication unit 150 transmits the second biological information to the communication unit 210 of the information processing device 200, according to the upload sequence of the unique profile described above with reference to FIG. 4, at the above-described second transmission timing (S113). The processing unit 230 of the information processing device 200 then acquires the second biological information from the communication unit 210 (S114).

After the transmission of the second biological information is completed, the processing unit 230 gives an instruction to change the communication speed to a third communication speed that is slower than the second communication speed (S115). That is, the processing unit 230 reports a communication speed change instruction to change to the third communication speed, to the communication unit 210 (S115). Here, the third communication speed may be the same as the first communication speed.

The communication unit 210 of the information processing device 200 transmits the communication speed change instruction to the communication unit 150 of the biological information measuring device 100 (S116).

In response to this, the communication unit 150 of the biological information measuring device 100 changes the communication speed on the basis of the received communication speed change instruction (S117). That is, the communication unit 150 changes the communication speed to the third communication speed, which is slower than the second communication speed, after the transmission of the second biological information is completed (S117). The above is the flow of a series of processes of the transmission/reception processing for the second biological information. The processing of these Steps S109 to S117 is carried out every second communication cycle.

In this way, the communication speed is raised only when communication is carried out according to the unique profile, and the communication speed is lowered when communication is carried out without using the unique profile. Therefore, it is possible to maintain the power saving property, or the like.

When biological information is transmitted according to the unique profile, the following processing is carried out in addition to the reporting of the upload data size.

First, if the communication unit 150 of the biological information measuring device 100 is able of transmit biological information at the second transmission timing, the communication unit 150 transmits, to the information processing device 200, a notification that transmission of biological information is possible.

If the communication unit 210 receives the notification that transmission of second biological information is possible from the biological information measuring device 100, the processing unit 230 of the information processing device 200 instructs the biological information measuring device 100 to start transmitting the second biological information. At this point, the communication unit 210 transmits a transmission start instruction to the biological information measuring device 100.

The subsequent processing is similar to the above-described T101 and onward of FIG. 4. Specifically, if the communication unit 150 receives the transmission start instruction from the information processing device 200, the communication unit 150 transmits the upload data size of the biological information with a third characteristic provided with a property of read with acknowledge, to the information processing device 200, and starts transmitting the biological information.

4. Example of Configuration of Biological Information Measuring Device

Figure 14A:
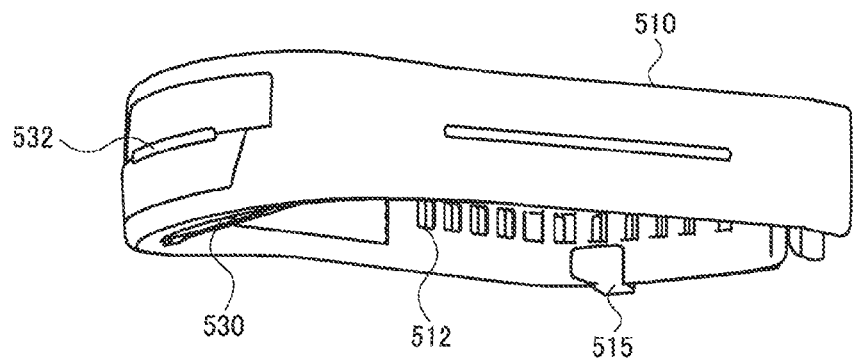
FIGS. 14A and 14B show the appearance of the biological information measuring device according to the embodiment.
Figure 14B:
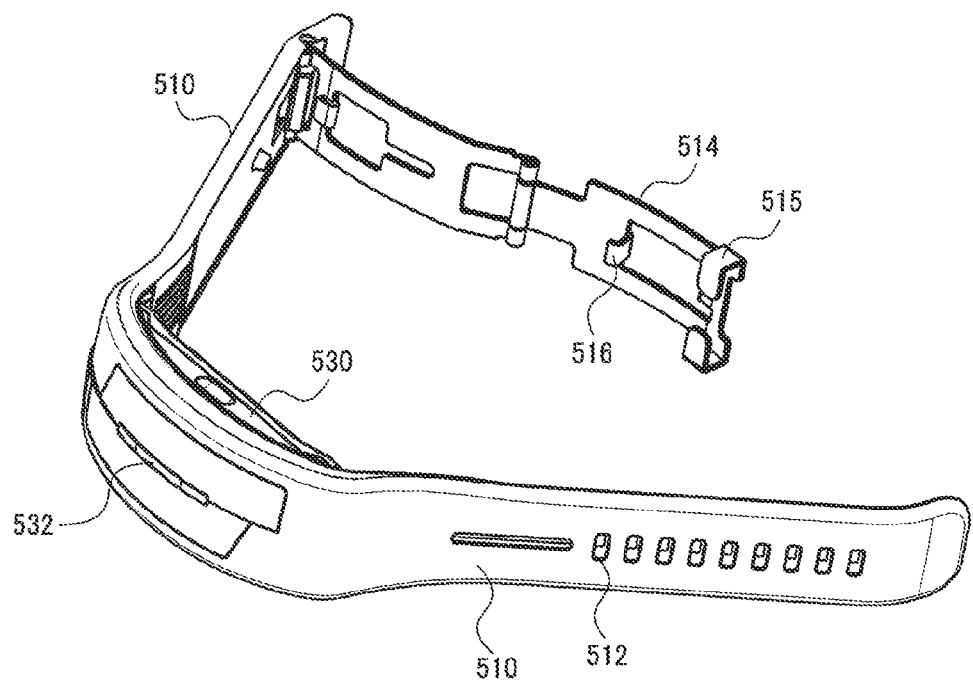
Figure 15:
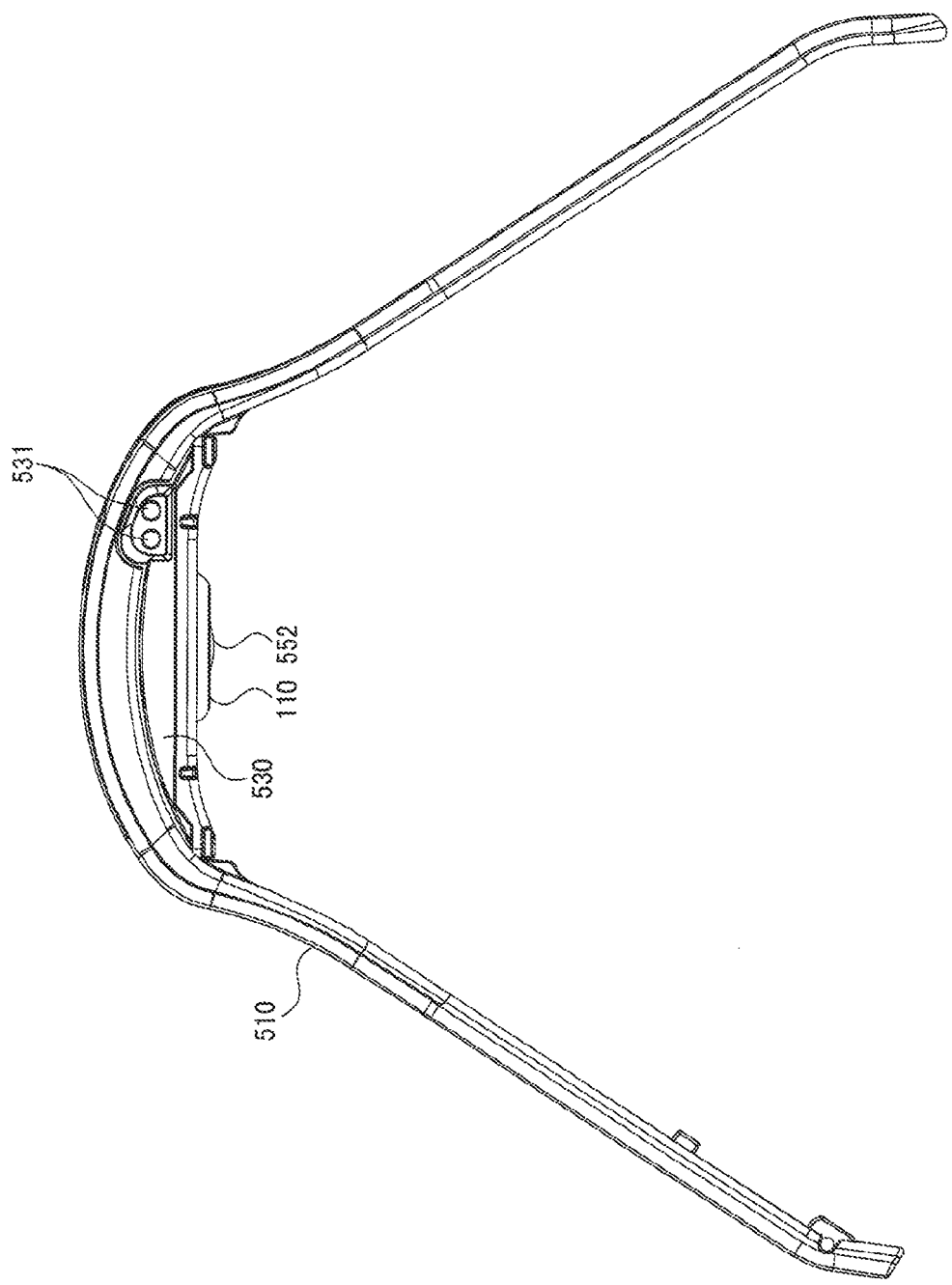
FIG. 15 shows the appearance of the biological information measuring device according to the embodiment.

FIGS. 14A, 14B and 15 show the appearance of a biological information measuring device (biological information detecting device) according to this embodiment. FIG. 14A shows the biological information measuring device, as viewed from the front. FIG. 14B shows the same device, as viewed from above. FIG. 15 shows the same device from a lateral side.

As shown in FIGS. 14A to 15, the biological information measuring device has a band section 510, a case section 530, and the sensor unit 110. The case section 530 is mounted on the band section 510. The sensor unit 110 is provided on the case section 530. The biological information measuring device has the processing unit 130, the communication unit 150, the time output unit 170, and the storage unit 190, as shown in FIG. 9. These units are provided in the case section 530. However, the biological information measuring device of this embodiment is not limited to the configuration shown in FIGS. 14A to 15 or the like and may be modified in various manners, such as omitting a part of the components, replacing a part of the components with another component, or adding another component.

The band section 510 is to be wound on the user's wrist so that the user can wear the biological information measuring device. The band section 510 has a hole section 512 and a buckle section 514. The buckle section 514 has a band insertion section 515 and a protrusion section 516. By inserting one end side of the band section 510 into the band insertion section 515 of the buckle section 514 and inserting the protrusion section 516 of the buckle section 514 into the hole section 512 of the band section 510, the user can wear the biological information measuring device on the wrist. In this case, the magnitude of pressure on the sensor unit 110 (pressure on the surface of the wrist) is adjusted according to which hole section 512 the protrusion section 516 is inserted into.

The case section 530 is equivalent to a main body section of the biological information measuring device. Inside the case section 530, various components of the biological information measuring device such as the sensor unit 110 and the processing unit 130 are provided. That is, the case section 530 is a casing that houses these components.

A light emitting window section 532 is provided in the case section 530. The light emitting window section 532 is formed with a light-transmitting member. Also, a light emitting section (LED) mounted on the flexible board is provided in the case section 530, and light from the light emitting section is cast outside the case section 530 via the light emitting window section 532.

As shown in FIG. 15, a terminal portion 531 is provided in the case section 530. If the biological information measuring device is installed on a cradle, not shown, the terminal portion of the cradle and the terminal portion 531 of the case section 530 are electrically connected together. This enables a secondary battery (battery) provided in the case section 530 to be charged.

The sensor unit 110 is to detect biological information such as pulse wave or the like of a subject. For example, the sensor unit 110 has a light receiving section and a light emitting section. The sensor unit 110 also has a protruding section 552 which is formed with a light-transmitting member and which contacts and pressurizes the skin surface of the subject. In the state where the protruding section 552 pressurizes the skin surface in this manner, the light emitting section emits light, and the light receiving section receives reflected light of the light reflected by the subject (blood vessel). The result of the light reception is outputted to the processing unit 130 as a detection signal. The processing unit 130 then detects biological information such as pulse wave on the basis of the detection signal from the sensor unit 110. The biological information to be detected by the biological information measuring device of this embodiment is not limited to pulse wave (pulse rate). The biological information measuring device may be a device which detects other biological information than pulse wave (for example, blood oxygen saturation level, body temperature, heart rate and the like).

Figure 16:
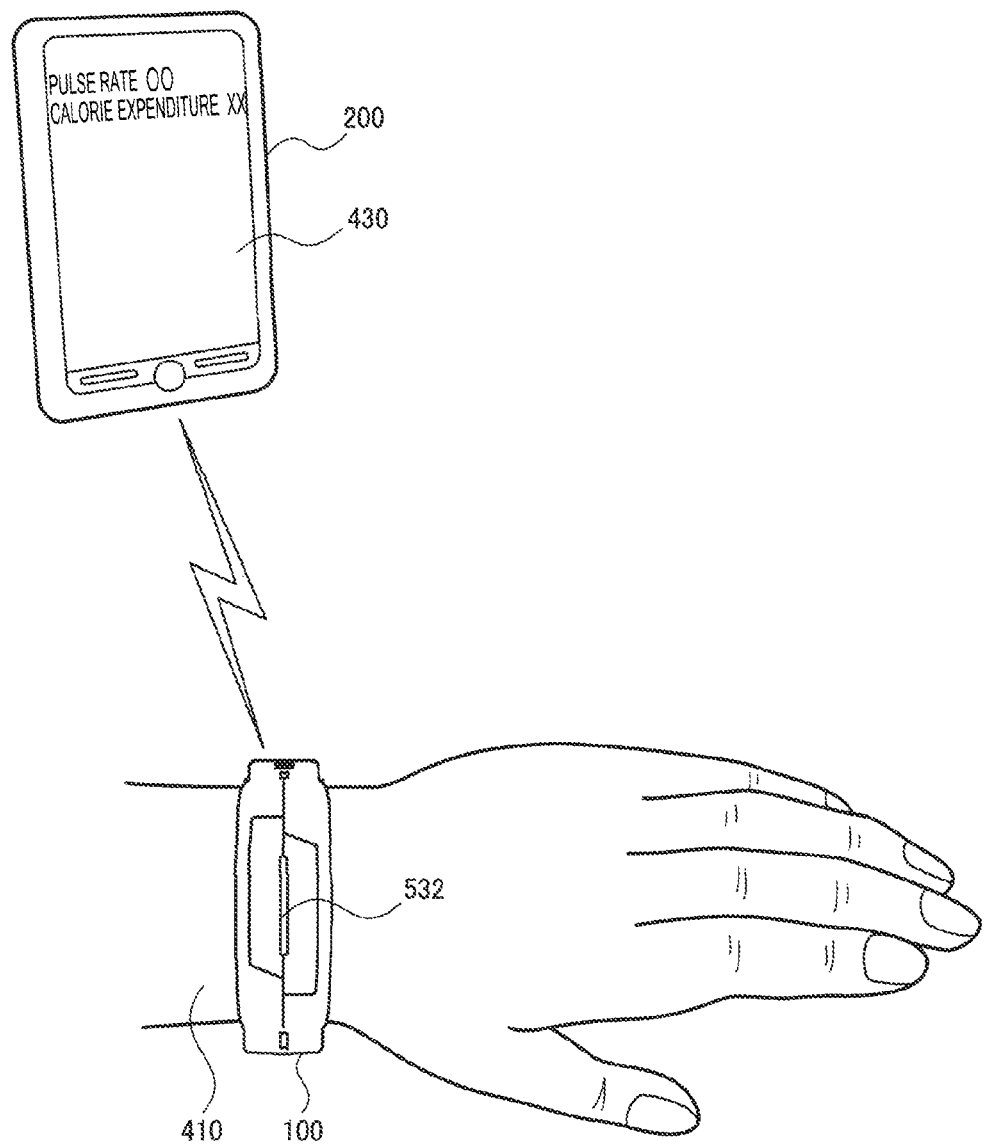
FIG. 16 is an explanatory view of the wearing of the biological information measuring device and its communication with the information processing device.

FIG. 16 is an explanatory view of the wearing of the biological information measuring device 100 and the communication with the information processing device 200.

As shown in FIG. 16, a user as a subject wears the biological information measuring device 100 on a wrist 410, like a wristwatch. The sensor unit 110 is provided on the surface on the subject side of the case section 530, as shown in FIG. 15. Therefore, as the biological information measuring device 100 is worn, the protruding section 552 of the sensor unit 110 contacts and pressurizes the skin surface of the wrist 410. As the light emitting section of the sensor unit 110 emits light in this state and the light receiving section receives the reflected light, biological information such as pulse wave is detected.

The biological information measuring device 100 and the information processing device 200 are connected for communication and capable of exchanging data. The information processing device 200 is a mobile communication terminal, for example, a smartphone, mobile phone, feature phone or the like. Alternatively, the information processing device 200 may be an information processing terminal such as a tablet computer. For the connection for communication between the biological information measuring device 100 and the information processing device 200, for example, Bluetooth near field communication or the like can be employed. As the biological information measuring device 100 and the mobile communication terminal 200 are thus connected for communication, various kinds of biological information (first biological information and second biological information) such as pulse rate and calorie expenditure can be displayed on a display section 430 (LCD or the like) of the mobile communication terminal 200. That is, various kinds of information found on the basis of the detection signal from the sensor unit 110 can be displayed. Arithmetic processing of the information such as pulse rate and calorie expenditure may be executed in the biological information measuring device 100. Alternatively, at least a part of the arithmetic processing may be executed in the mobile communication terminal 200.

A part or a major part of the processing in the information processing device, the communication method and the communication system or the like according to the embodiment may be realized by a program. In this case, as a processor such as CPU executes the program, the information processing device, the communication method and the communication system or the like according to the embodiment is realized. Specifically, a program stored in a non-temporary information storage device is read out, and the processor such as CPU executes the program that is read out. Here, the information storage device (computer-readable device) is configured to store a program and data, and the function thereof can be realized by an optical disk (DVD, CD or the like), HDD (hard disk drive) or memory (card memory, ROM or the like), or the like. The processor such as CPU carries out various kinds of processing according to the embodiment, on the basis of the program (data) stored in the information storage device. That is, a program for causing a computer (device having an operation unit, a processing unit, a storage unit and an output unit) to function as each unit of the embodiment (program for causing a computer to execute processing by each unit) is stored in the information storage device.

The information processing device and the communication system or the like according to the embodiment may include a processor and a memory. The processor in this case may be, for example, a CPU (central processing unit). However, the processor is not limited to a CPU, and various other processors such as GPU (graphics processing unit) or DSP (digital signal processor) can be used. The processor may also be a hardware circuit based on ASIC (application specific integrated circuit). The memory is configured to store a computer-readable command. As the command is executed by the processor, each unit in the information processing device and the communication system or the like according to the embodiment is realized. The memory in this case may be a semiconductor memory such as SRAM (static random access memory or DRAM (dynamic random access memory), or may be a register, hard disk or the like. The command in this case may be a command of a command set that forms the program, or a command which instructs the hardware circuit of the processor to carry out an operation.

The embodiment is described above in detail. However, a person skilled in the art will readily understand that a number of modifications can be made without substantially departing from the new matters and effects of the invention. Therefore, all such modifications are considered as included in the scope of the invention. For example, a term that is described along with a different term with a broader meaning or the same meaning at least once in the specification or drawings can be replaced with the different term at any part of the specification or drawings. Also, the configurations and operations of the information processing system and the communication system are not limited to those described in the embodiment and various modifications can be made thereto.

What is claimed is:

1. An information processing device comprising:
    an information acquisition unit which acquires information; and
    a communication unit which communicates with an external device via near field communication;
    wherein the communication unit divides data of the acquired information into a plurality of blocks, each block including a plurality of packets, transmits the plurality of packets of a first block of the plurality of blocks with a first characteristic provided with a property of read with no acknowledge, and in response to transmitting the plurality of packets of the first block, receives a receiving result, associated with the first block, from the external device, with a second characteristic provided with the property of write with acknowledge.

2. The information processing device according to claim 1, wherein
    if the receiving result is an acknowledge command associated with the first block, the communication unit determines that reception of the first block by the external device is successful.

3. The information processing device according to claim 1, wherein
    the transmitted plurality of packets of the first block include sequence numbers indicating the order of transmission of the plurality of packets; and
    if the receiving result includes one of the sequence numbers of the plurality of packets included in the first block, the communication unit retransmits packets included in the first block starting with the packet corresponding to the sequence number included in the receiving result.

4. The information processing device according to claim 1, wherein
    when the communication unit is in a state where transmission of the information is possible, the communication unit transmits, to the external device, an upload data size of the information with a third characteristic provided with the property of read with acknowledge.

5. A communication method comprising:
    acquiring information;
    dividing data of the information into a plurality of blocks, each block including a plurality of packets;
    transmitting the plurality of packets of a first block of the plurality of blocks to an external device with a first characteristic provided with a property of read with no acknowledge; and
    in response to transmitting the plurality of packets of the first block, receiving a receiving result, associated with the first block, from the external device, with a second characteristic provided with the property of write with acknowledge.

6. A communication system comprising:
    a first information processing device which acquires information; and
    a second information processing device which communicates with the first information processing device via near field communication;
    wherein the first information processing device divides data of the acquired information into a plurality of blocks, each block including a plurality of packets, and transmits the plurality of packets of a first block of the plurality of blocks to the second information processing device, with a first characteristic provided with a property of read with no acknowledge;
    the second information processing device receives the plurality of packets of the first block with the first characteristic and in response transmits, to the first information processing device, a receiving result, associate with the first block, with a second characteristic provided with the property of write with acknowledge, and
the first information processing device receives the receiving result with the second characteristic.

* * * * *